(12) United States Patent  
Saito

(10) Patent No.: US 12,399,352 B2
(45) Date of Patent: Aug. 26, 2025

(54) ZOOM LENS AND IMAGE-CAPTURING APPARATUS

(71) Applicant: CANON KABUSHIKI KAISHA, Tokyo (JP)

(72) Inventor: Shinichiro Saito, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 594 days.

(21) Appl. No.: 17/842,828

(22) Filed: Jun. 17, 2022

(65) Prior Publication Data

US 2023/0028080 A1 Jan. 26, 2023

(30) Foreign Application Priority Data

Jul. 9, 2021 (JP) .................................. 2021-113967

(51) Int. Cl.
*G02B 15/14* (2006.01)
*G02B 13/00* (2006.01)

(52) U.S. Cl.
CPC ..... *G02B 15/1441* (2019.08); *G02B 13/0045* (2013.01)

(58) Field of Classification Search
CPC ........ G02B 15/1441; G02B 15/144105; G02B 15/146; G02B 15/1465; G02B 13/0045
See application file for complete search history.

(56) References Cited

U.S. PATENT DOCUMENTS

| 10,718,929 B2 | 7/2020 | Saito et al. |
| 10,935,755 B2 | 3/2021 | Saito et al. |
| 11,073,684 B2 | 7/2021 | Saito |
| 11,150,467 B2 | 10/2021 | Saito |
| 2014/0118603 A1 | 5/2014 | Saito |
| 2015/0378134 A1* | 12/2015 | Koga .................. G02B 5/1814 |
| | | 359/356 |
| 2016/0154226 A1* | 6/2016 | Miyazawa ............. G02B 15/20 |
| | | 359/557 |

(Continued)

FOREIGN PATENT DOCUMENTS

| JP | 2000-347102 A | 12/2000 |
| JP | 2006-308649 A | 11/2006 |

(Continued)

OTHER PUBLICATIONS

Notice of Reasons for Refusal issued by the Japanese Patent Office on May 27, 2025 in corresponding JP Patent Application No. 2021-113967, with English translation.

*Primary Examiner* — Angela M. Medich
(74) *Attorney, Agent, or Firm* — Carter, DeLuca & Farrell LLP

(57) ABSTRACT

A zoom lens consists of four or more lens units including, in order from an object side to an image side, first, second, and third lens units having positive, negative, and positive refractive powers, respectively. During zooming from a wide-angle end to a telephoto end, the first lens unit moves, a distance between the first lens unit and the second lens unit is widened, and a distance between the second lens unit and the third lens unit is narrowed. The first lens unit consists of a single positive lens, the second lens unit includes three single lens elements, each having a negative refractive power, arranged continuously in order from the object side to the image side, predetermined conditions are satisfied.

20 Claims, 19 Drawing Sheets

(56) References Cited

U.S. PATENT DOCUMENTS

| | | | |
|---|---|---|---|
| 2017/0090165 A1* | 3/2017 | Kodaira | ............... G02B 5/005 |
| 2020/0310088 A1 | 10/2020 | Saito | |
| 2021/0149165 A1 | 5/2021 | Saito et al. | |
| 2022/0382019 A1 | 12/2022 | Ebe et al. | |

FOREIGN PATENT DOCUMENTS

| | | |
|---|---|---|
| JP | 2009-223008 A | 10/2009 |
| JP | 2014-035390 A | 2/2014 |
| JP | 2014-098796 A | 5/2014 |
| JP | 2014-134747 A | 7/2014 |
| JP | 2018-109757 A | 7/2018 |

* cited by examiner

ZOOM LENS AND IMAGE-CAPTURING APPARATUS

BACKGROUND OF THE INVENTION

Field of the Invention

The aspect of the embodiments relates to a zoom lens suitable for an image-capturing apparatus such as a digital video camera, a digital still camera, a broadcasting camera, a silver-halide film camera, and a surveillance camera.

Description of the Related Art

Conventionally, in a zoom lens used for a photographic camera or a video camera, a so-called rear focus method has been proposed in which focusing is performed by moving a lens unit arranged on an image side of a first lens unit arranged on an object side.

Further, in a digital camera and a video camera, the number of pixels of a solid-state image sensor such as a CCD sensor or a CMOS sensor is increasing. In addition, in an image-capturing lens, high optical performance including chromatic aberration is required, and miniaturization of the image-capturing lens is progressing.

Japanese Patent Application Laid-Open No. ("JP") 2014-134747 and JP 2014-035390 disclose a zoom lens having a four-unit configuration consisting of, in order from an object side, first to fourth lens units having positive, negative, positive, and positive refractive powers. In JP 2014-134747, the first lens unit consists of a single positive lens, the second lens unit consists of, in order from the object side, a negative lens, a negative lens, a negative lens, and a positive lens. With this configuration, wider angle and the small number of lenses are achieved. In JP 2014-035390, the first lens unit consists of a cemented lens of a negative lens and a positive lens, and the second lens unit consists of, in order from the object side, a negative lens, a negative lens, a negative lens, and a positive lens. With this configuration, wider angle and the small number of lenses are achieved.

In recent years, there has been a strong demand for a lens system used in an image-capturing apparatus to have the high optical performance while the entire lens system is small in size. In order to obtain good optical performance while reducing the size of the entire lens system, it is important to appropriately set a refractive power of each lens unit and a moving condition of each lens unit associated with zooming. In particular, in a camera having a large image sensor, in a case where a desired magnification is secured while achieving the wider angle, a front lens tends to be large, and it is necessary to make a configuration of each lens unit appropriate.

In JP 2014-134747, although the high optical performance is secured by ensuring a sufficient overall lens length in a telephoto range and suppressing the refractive power of each lens, in a case where an image circle diameter is large, the entire lens system becomes large.

In JP 2014-035390, although a distance between the second lens unit and the third lens unit is sufficiently secured in a wide-angle range, and lateral chromatic aberration, curvature of field, and distortion, which are problems due to the wider angle, are satisfactorily corrected, there remains a problem in miniaturization of the entire lens system.

SUMMARY OF THE INVENTION

The present disclosure provides a compact zoom lens capable of obtaining high optical performance while achieving wider angle.

A zoom lens according to one aspect of the embodiments consists of four or more lens units including, in order from an object side to an image side, a first lens unit having a positive refractive power, a second lens unit having a negative refractive power, and a third lens unit having a positive refractive power. During zooming from a wide-angle end to a telephoto end, the first lens unit moves, a distance between the first lens unit and the second lens unit is widened, and a distance between the second lens unit and the third lens unit is narrowed. The first lens unit consists of a single positive lens. The second lens unit includes three single lens elements, each having a negative refractive power, arranged continuously in order from the object side to the image side. Following inequalities are satisfied:

$1.715 < SFY < 10.0$, and $-7.5 < f1/f2 < -0.5$, where SFY is a shape factor of a second single lens element adjacent to a first single lens element arranged on a most object side among the three single lens elements, f1 is a focal length of the first lens unit, and f2 is a focal length of the second lens unit.

A zoom lens according to another aspect of the embodiments consists of four or more lens units including, in order from an object side to an image side, a first lens unit having a positive refractive power, a second lens unit having a negative refractive power, and a third lens unit having a positive refractive power. During zooming from a wide-angle end to a telephoto end, the first lens unit moves, a distance between the first lens unit and the second lens unit is widened, and a distance between the second lens unit and the third lens unit is narrowed. The first lens unit consists of one element lens having a positive refractive power. The second lens unit includes three single lens elements, each having a negative refractive power, arranged continuously in order from the object side to the image side. Following inequalities are satisfied:

$1.715 < SFY < 10.0$, $-7.5 < f1/f2 < -0.5$, and $0.5 < fZ/f2 < 1.96$, where SFY is a shape factor of a second single lens element adjacent to a first single lens element arranged on a most object side among the three single lens elements, f1 is a focal length of the first lens unit, f2 is a focal length of the second lens unit, fZ is a focal length of a third single lens element arranged on a most image side among the three single lens elements.

An image-capturing apparatus according to another aspect of the embodiments includes a zoom lens; and an image sensor configured to receive an image formed by the zoom lens. The zoom lens consists of four or more lens units including, in order from an object side to an image side, a first lens unit having a positive refractive power, a second lens unit having a negative refractive power, and a third lens unit having a positive refractive power. During zooming from a wide-angle end to a telephoto end, the first lens unit moves, a distance between the first lens unit and the second lens unit is widened, and a distance between the second lens unit and the third lens unit is narrowed. The first lens unit consists of a single positive lens. The second lens unit includes three single lens elements, each having a negative refractive power, arranged continuously in order from the object side to the image side. Following inequalities are satisfied:

$1.715 < SFY < 10.0$, and $-7.5 < f1/f2 < -0.5$, where SFY is a shape factor of a second single lens element adjacent to a first single lens element arranged on a most object side among the three single lens elements, f1 is a focal length of the first lens unit, and f2 is a focal length of the second lens unit.

Further features of the present disclosure will become apparent from the following description of exemplary embodiments with reference to the attached drawings.

DESCRIPTION OF THE EMBODIMENTS

Referring now to the accompanying drawings, a description will be given of examples according to the present disclosure.

Figure 1:
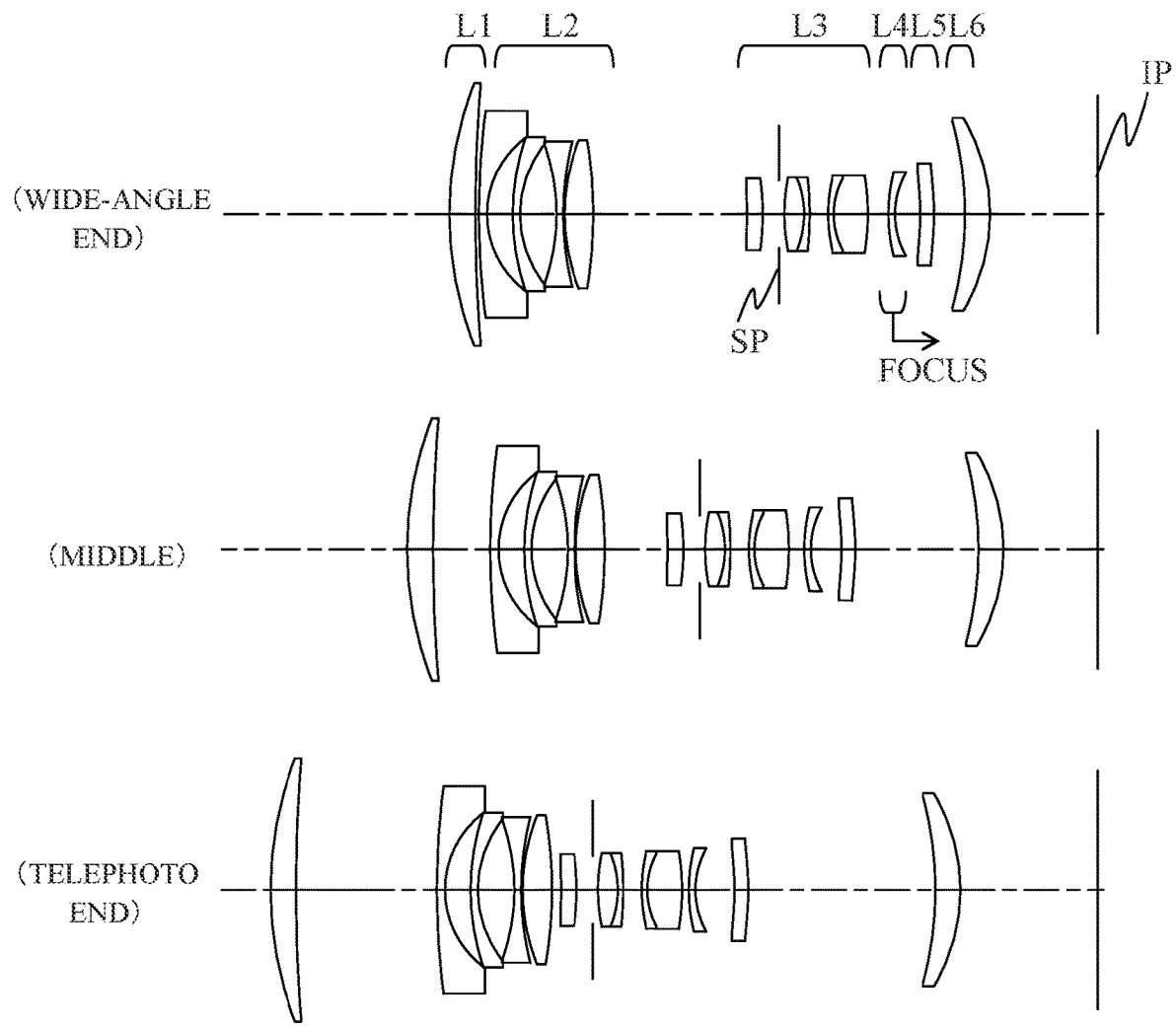
FIG. 1 is a sectional view illustrating a zoom lens at a wide-angle end, a middle zoom position, and a telephoto end, according to Example 1.
Figure 2A:
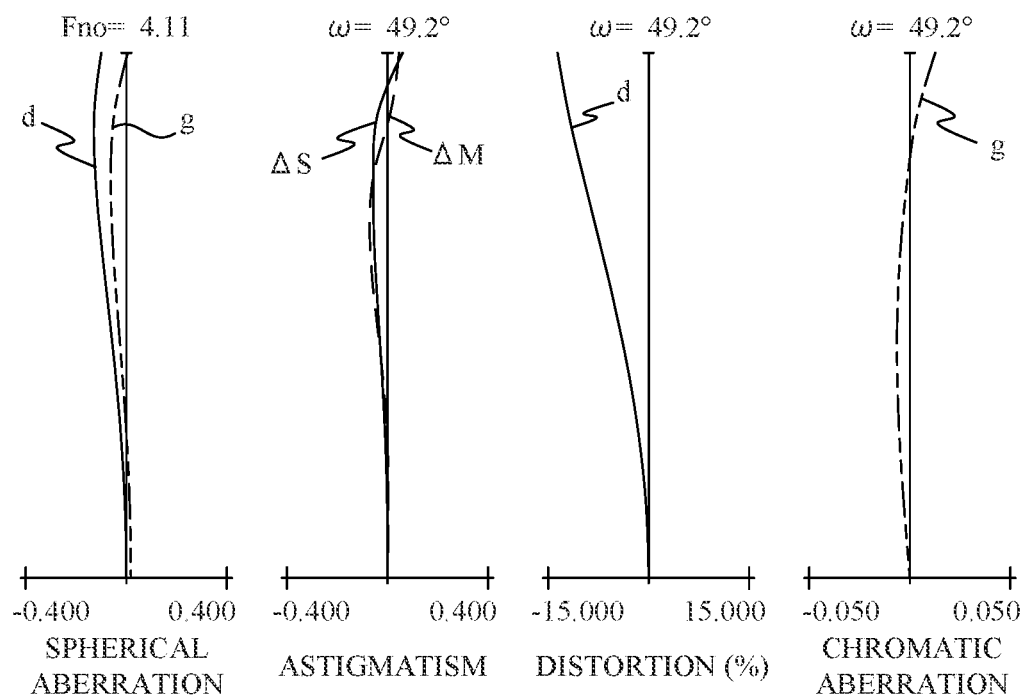
FIGS. 2A to 2C are aberration diagrams of the zoom lens at the wide-angle end, the middle zoom position, and the telephoto end, according to Example 1, respectively.
Figure 2B:
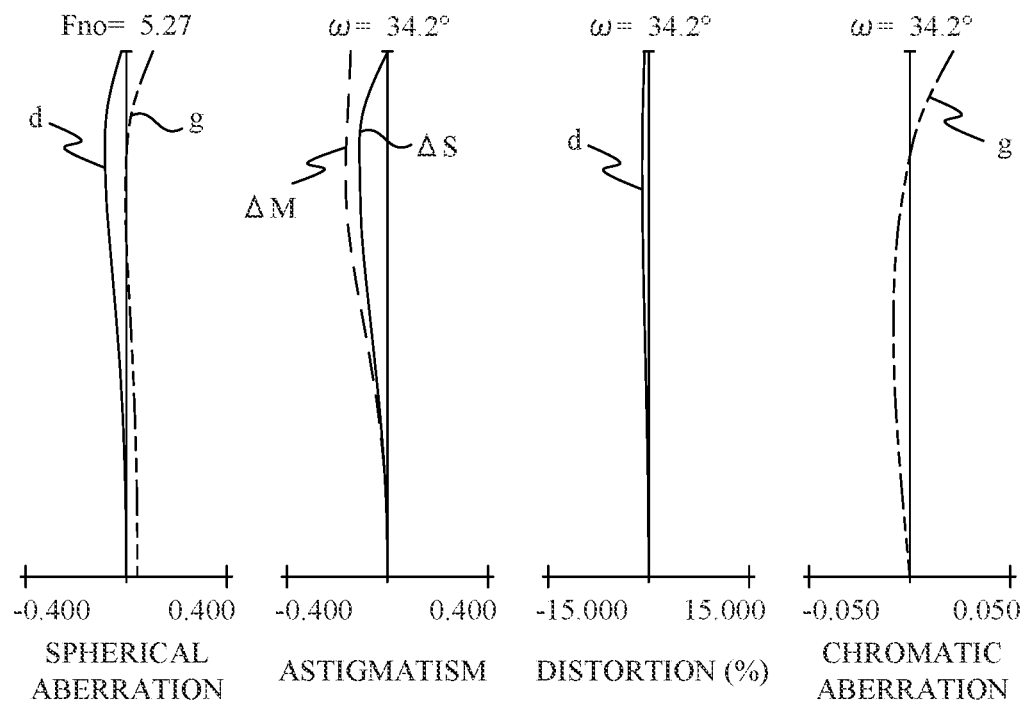
Figure 2C:
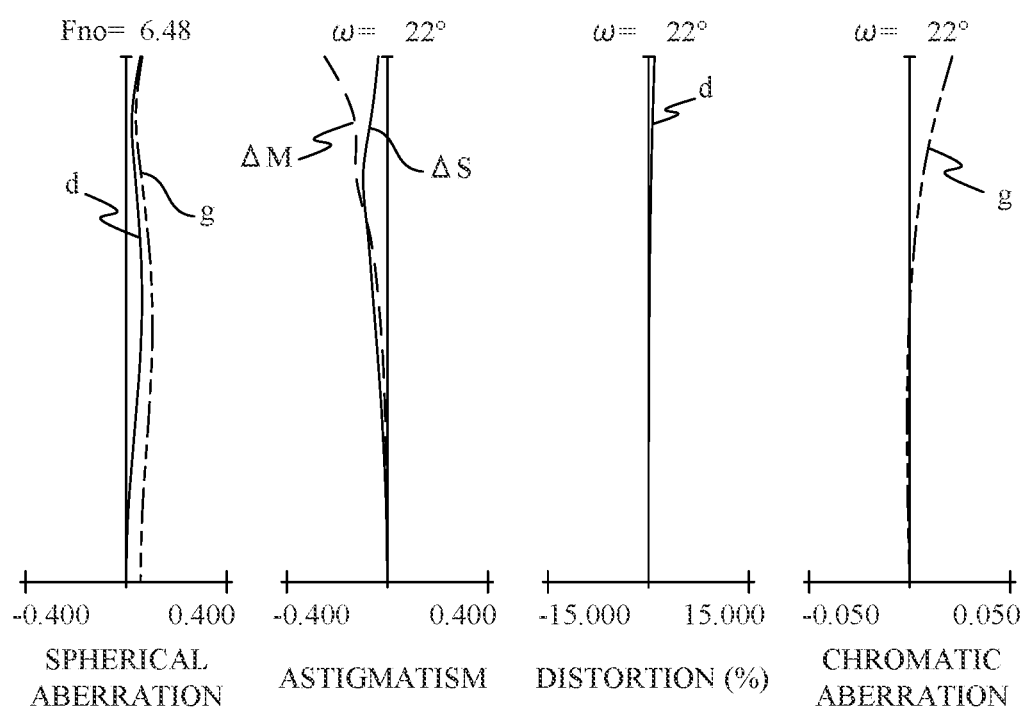

FIG. 1 is a sectional view illustrating a zoom lens at a wide-angle end, i.e., a shortest focal length end, at a middle zoom position, and at a telephoto end, i.e., a longest focal length end, according to Example 1. FIGS. 2A to 2C are aberration diagrams of the zoom lens at the wide-angle end, the middle zoom position, and the telephoto end, according to Example 1, respectively. The aberration diagrams of each example are obtained when the zoom lens focuses on an infinity object. The zoom lens according to Example 1 has a zoom ratio of 2.9 and an aperture ratio of about 4.1 to 6.5 in an entire zoom area.

Figure 3:
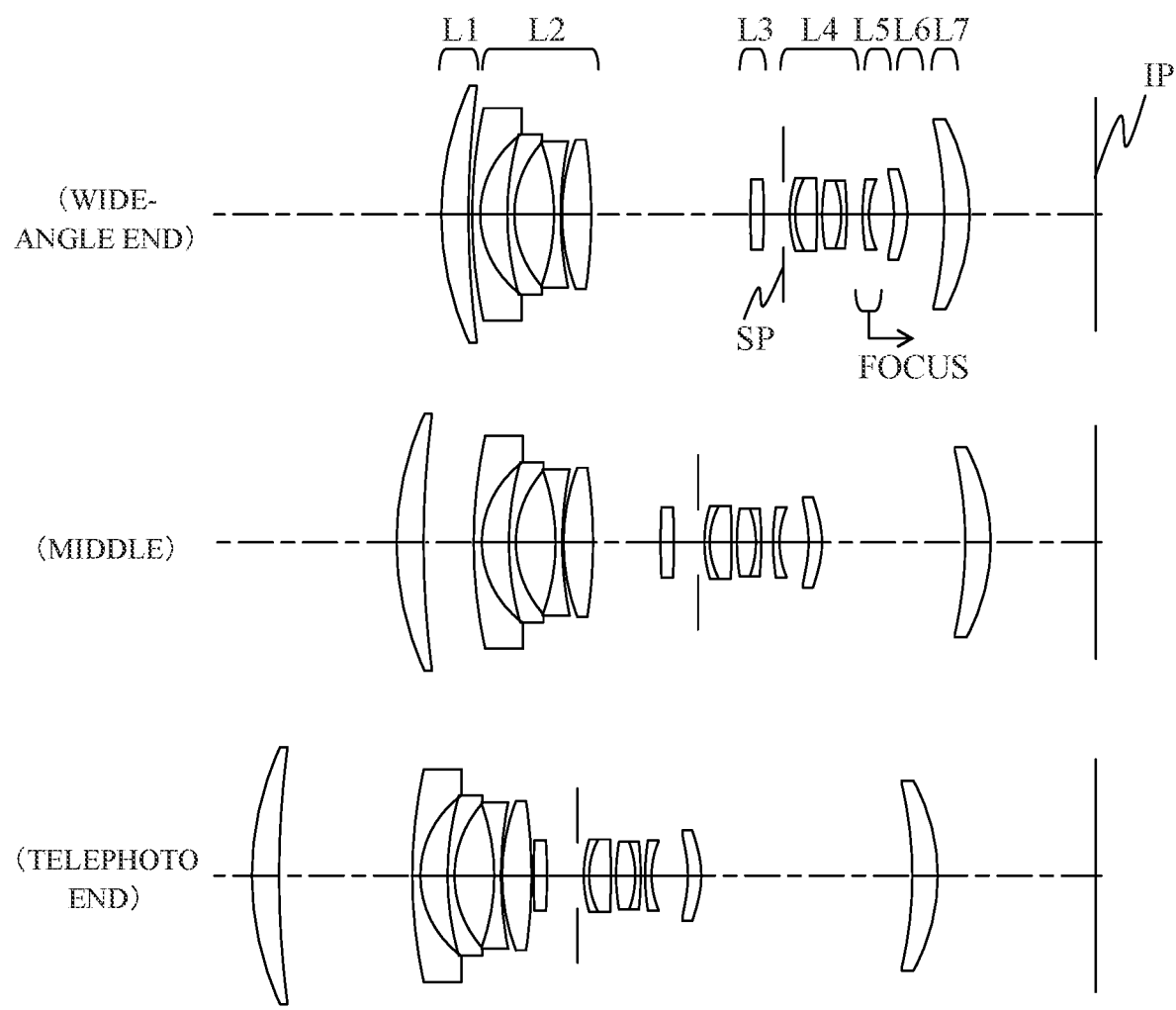
FIG. 3 is a sectional view illustrating a zoom lens at a wide-angle end, a middle zoom position, and a telephoto end, according to Example 2.
Figure 4A:
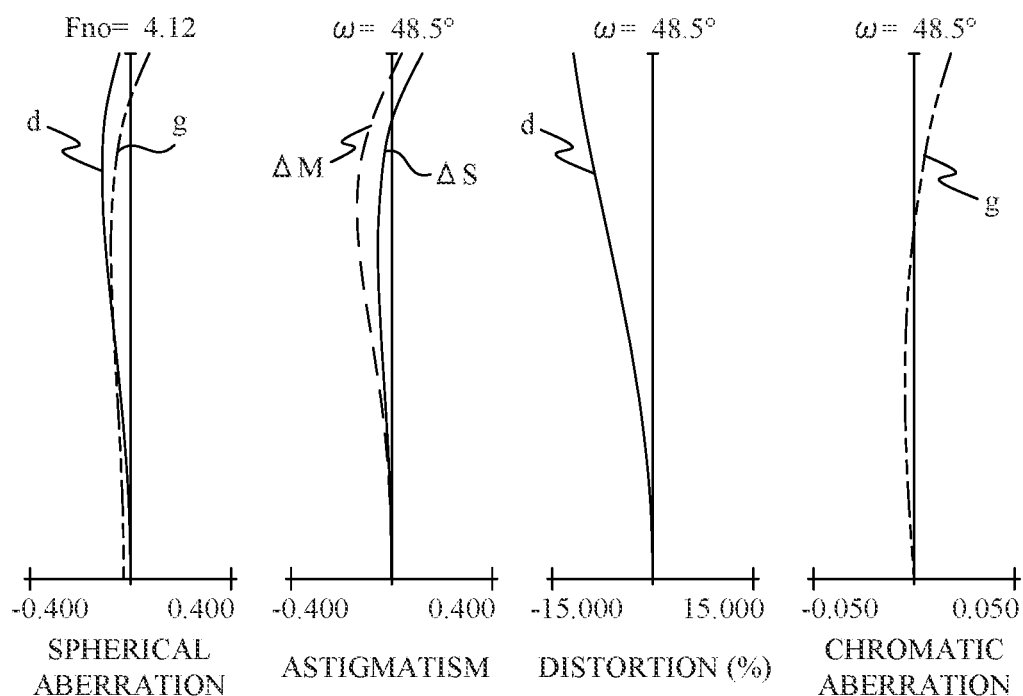
FIGS. 4A to 4C are aberration diagrams of the zoom lens at the wide-angle end, the middle zoom position, and the telephoto end, according to Example 2, respectively.
Figure 4B:
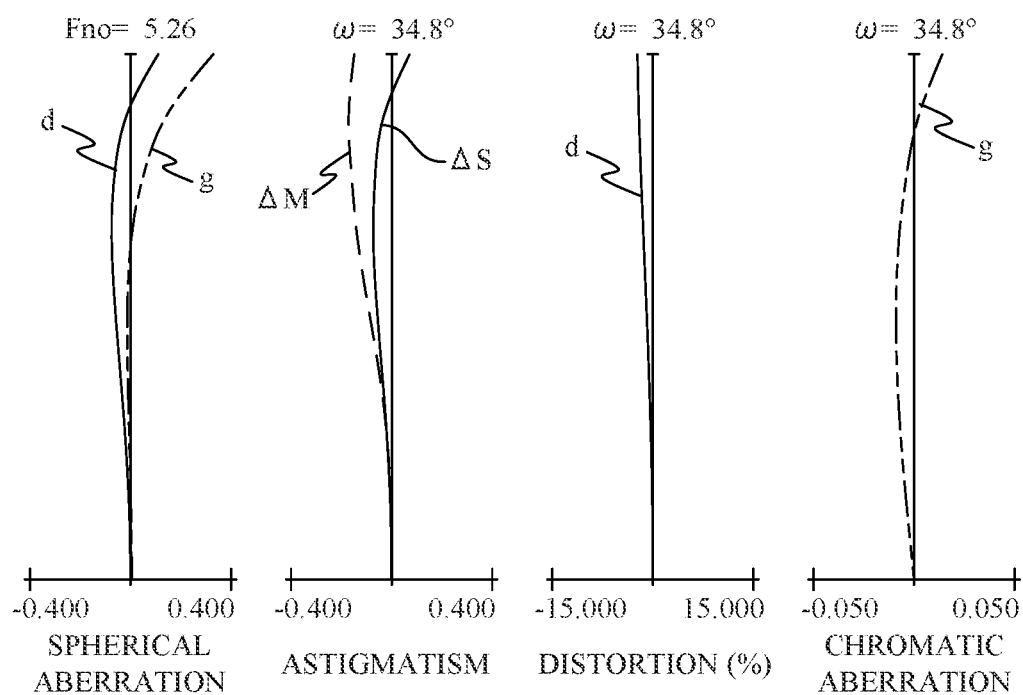
Figure 4C:
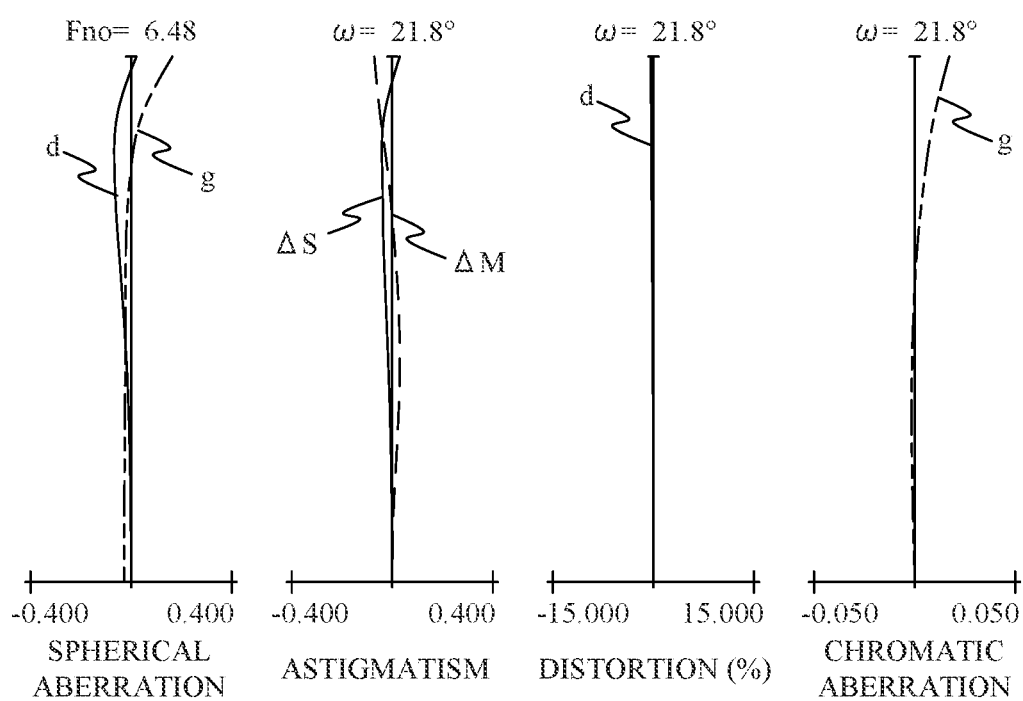

FIG. 3 is a sectional view illustrating a zoom lens at a wide-angle end, at a middle zoom position, and at a telephoto end, according to Example 2. FIGS. 4A to 4C are aberration diagrams of the zoom lens at the wide-angle end, the middle zoom position, and the telephoto end, according to Example 2, respectively. The zoom lens according to Example 2 has a zoom ratio of 2.9 and an aperture ratio of about 4.1 to 6.5 in an entire zoom area.

Figure 5:
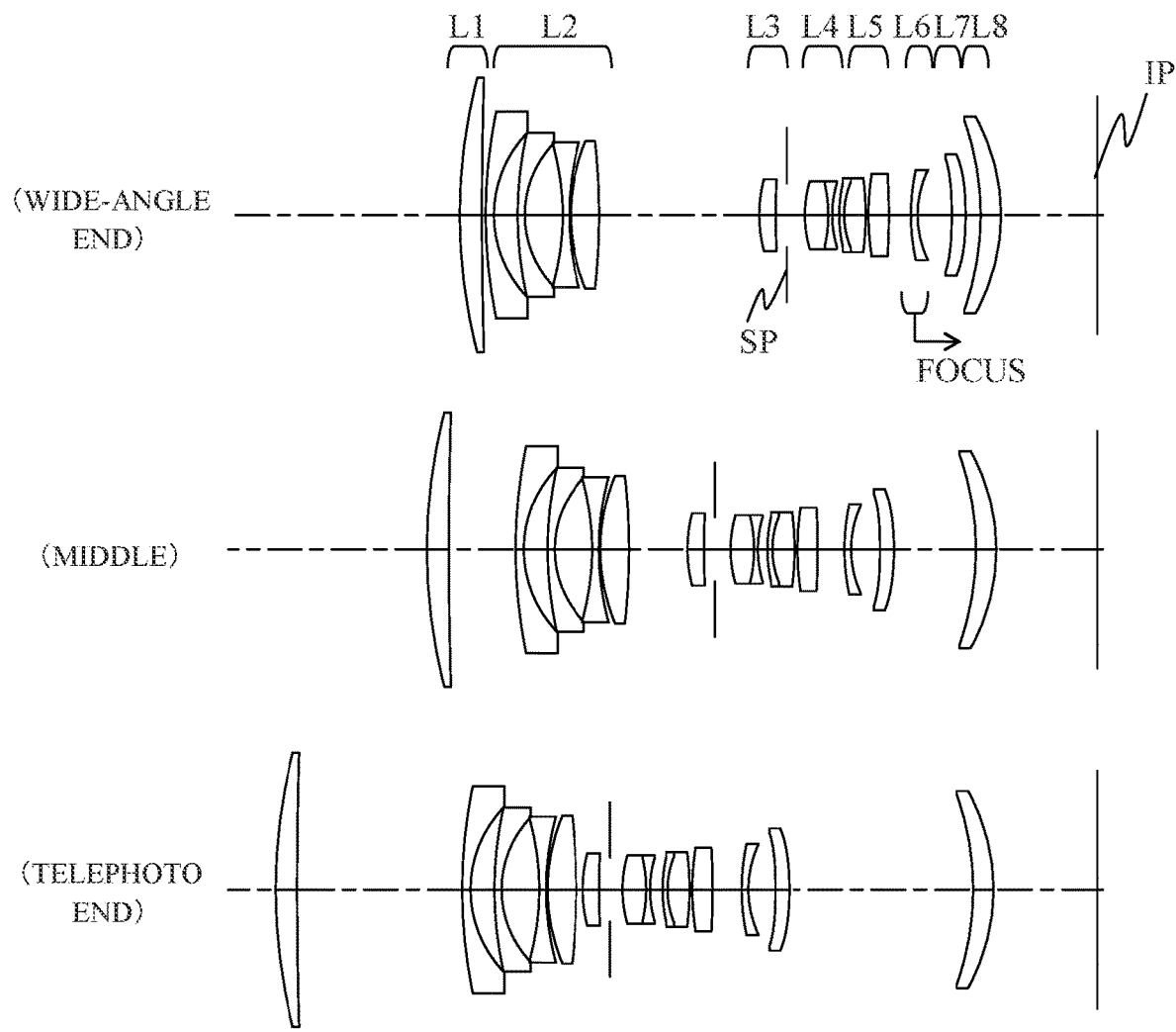
FIG. 5 is a sectional view illustrating a zoom lens at a wide-angle end, a middle zoom position, and a telephoto end, according to Example 3.
Figure 6A:
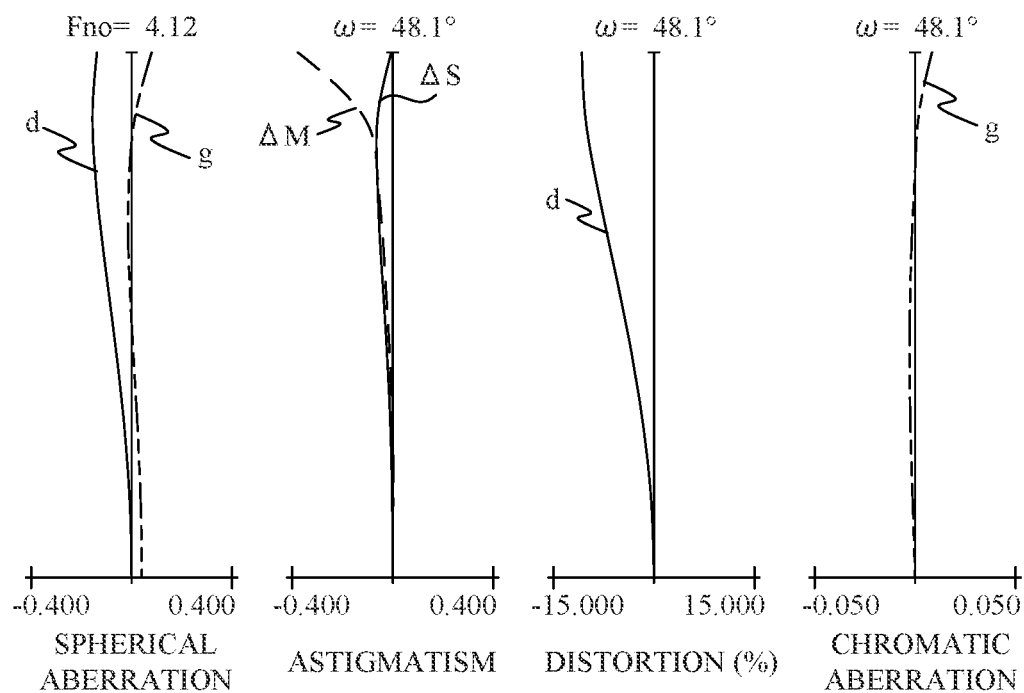
FIGS. 6A to 6C are aberration diagrams of the zoom lens at the wide-angle end, the middle zoom position, and the telephoto end, according to Example 3, respectively.
Figure 6B:
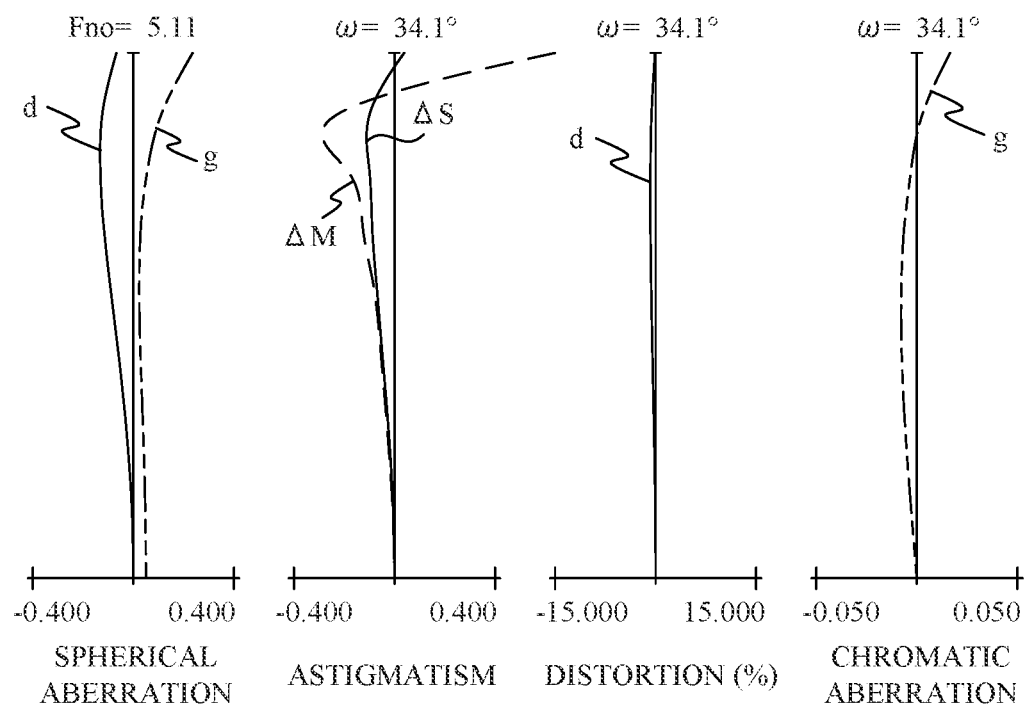
Figure 6C:
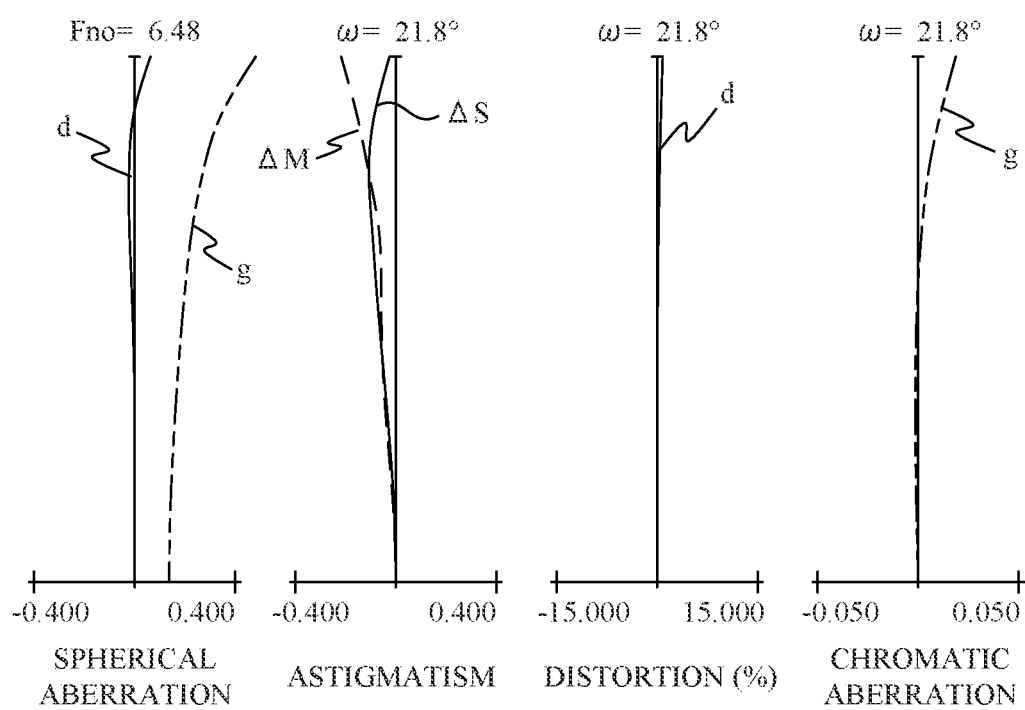

FIG. 5 is a sectional view illustrating a zoom lens at a wide-angle end, at a middle zoom position, and at a telephoto end, according to Example 3. FIGS. 6A to 6C are aberration diagrams of the zoom lens at the wide-angle end, the middle zoom position, and the telephoto end, according to Example 3, respectively. The zoom lens according to Example 3 has a zoom ratio of 2.9 and an aperture ratio of about 4.1 to 6.5 in an entire zoom area.

Figure 7:
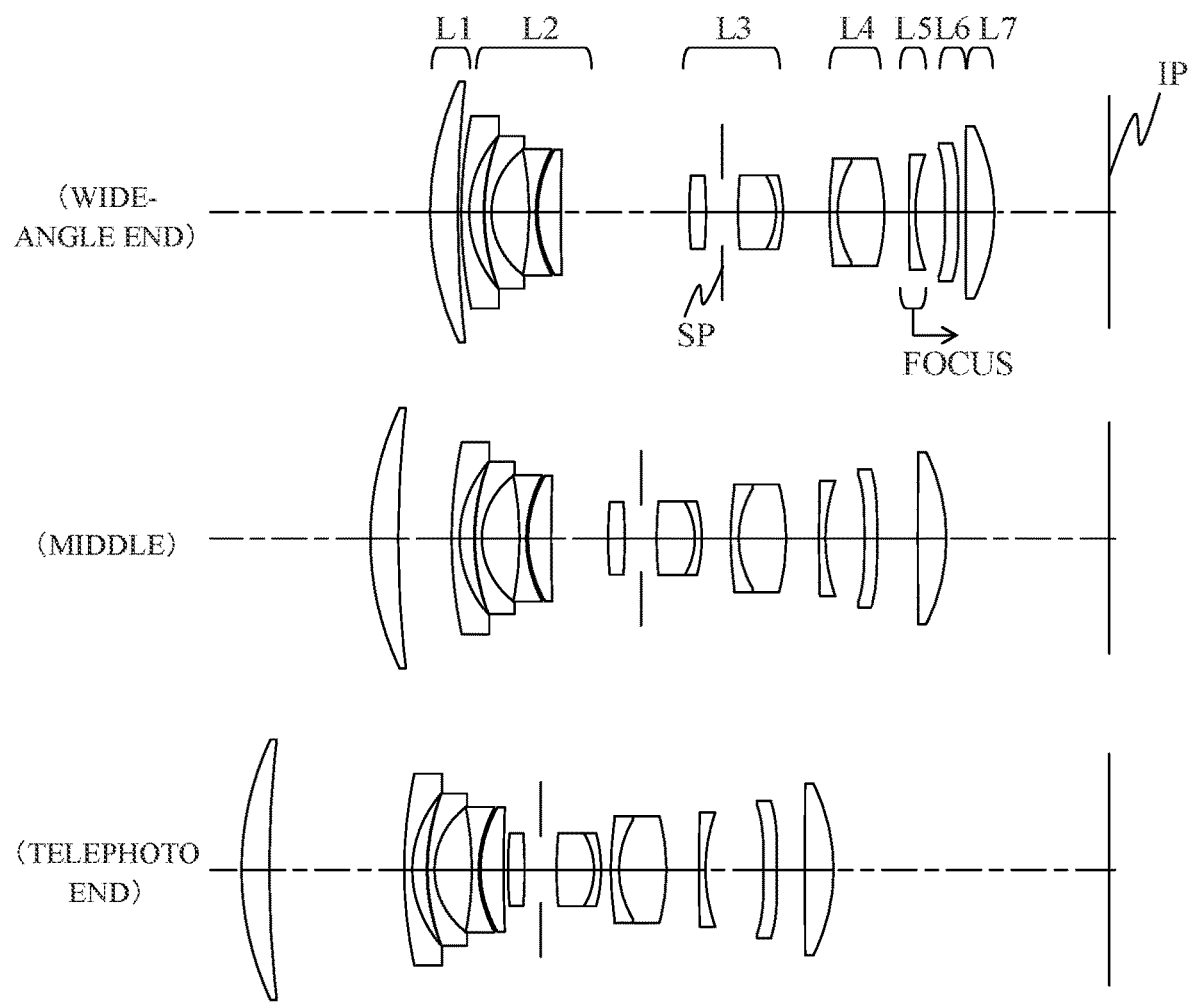
FIG. 7 is a sectional view illustrating a zoom lens at a wide-angle end, a middle zoom position, and a telephoto end, according to Example 4.
Figure 8A:
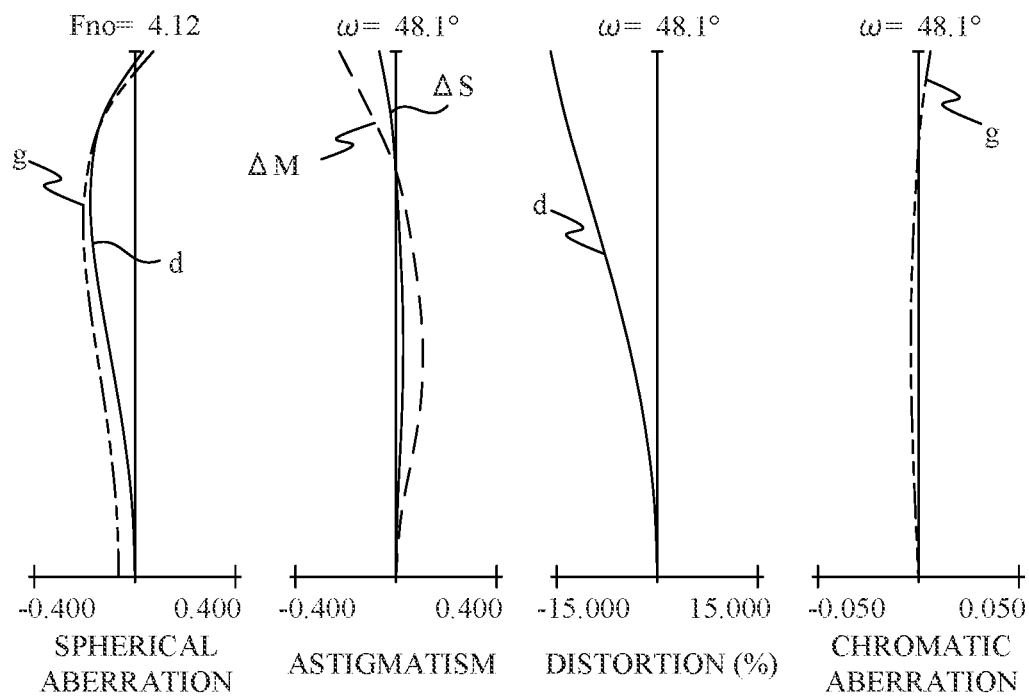
FIGS. 8A to 8C are aberration diagrams of the zoom lens at the wide-angle end, the middle zoom position, and the telephoto end, according to Example 4, respectively.
Figure 8B:
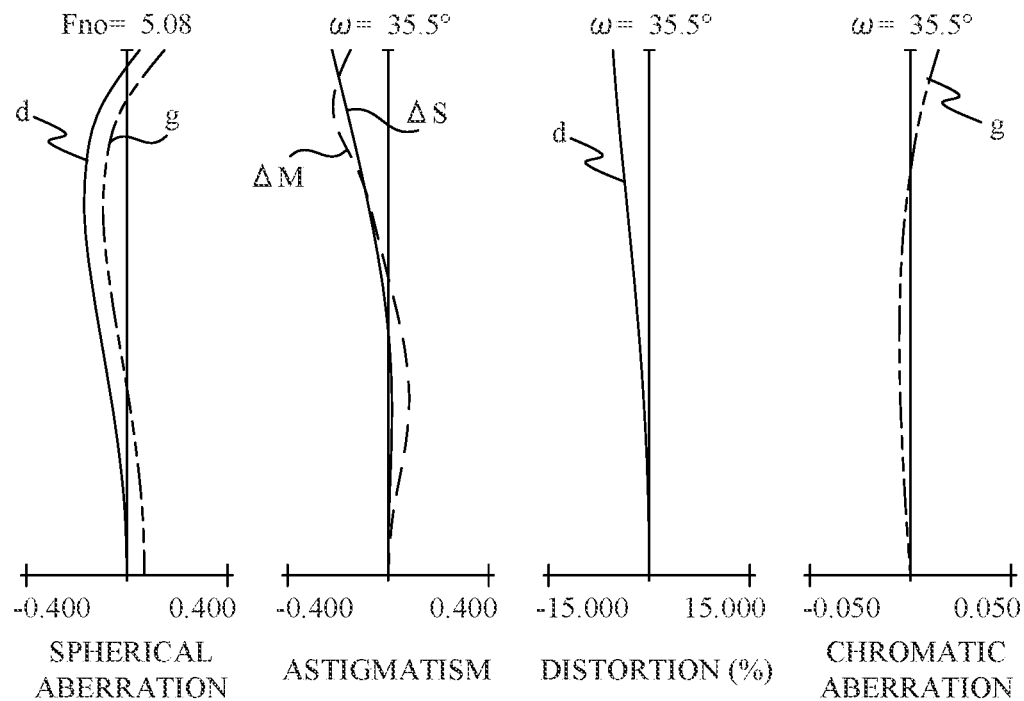
Figure 8C:
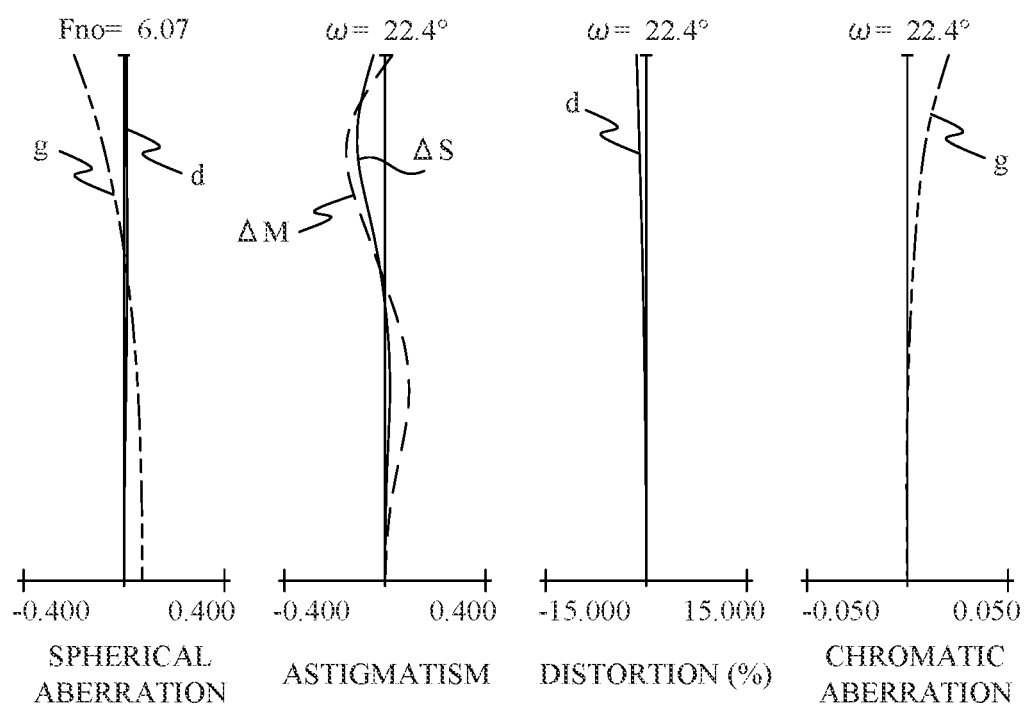

FIG. 7 is a sectional view illustrating a zoom lens at a wide-angle end, at a middle zoom position, and at a telephoto end, according to Example 4. FIGS. 8A to 8C are aberration diagrams of the zoom lens at the wide-angle end, the middle zoom position, and the telephoto end, according to Example 4, respectively. The zoom lens according to Example 4 has a zoom ratio of 2.7 and an aperture ratio of about 4.1 to 6.0 in an entire zoom area.

Figure 9:
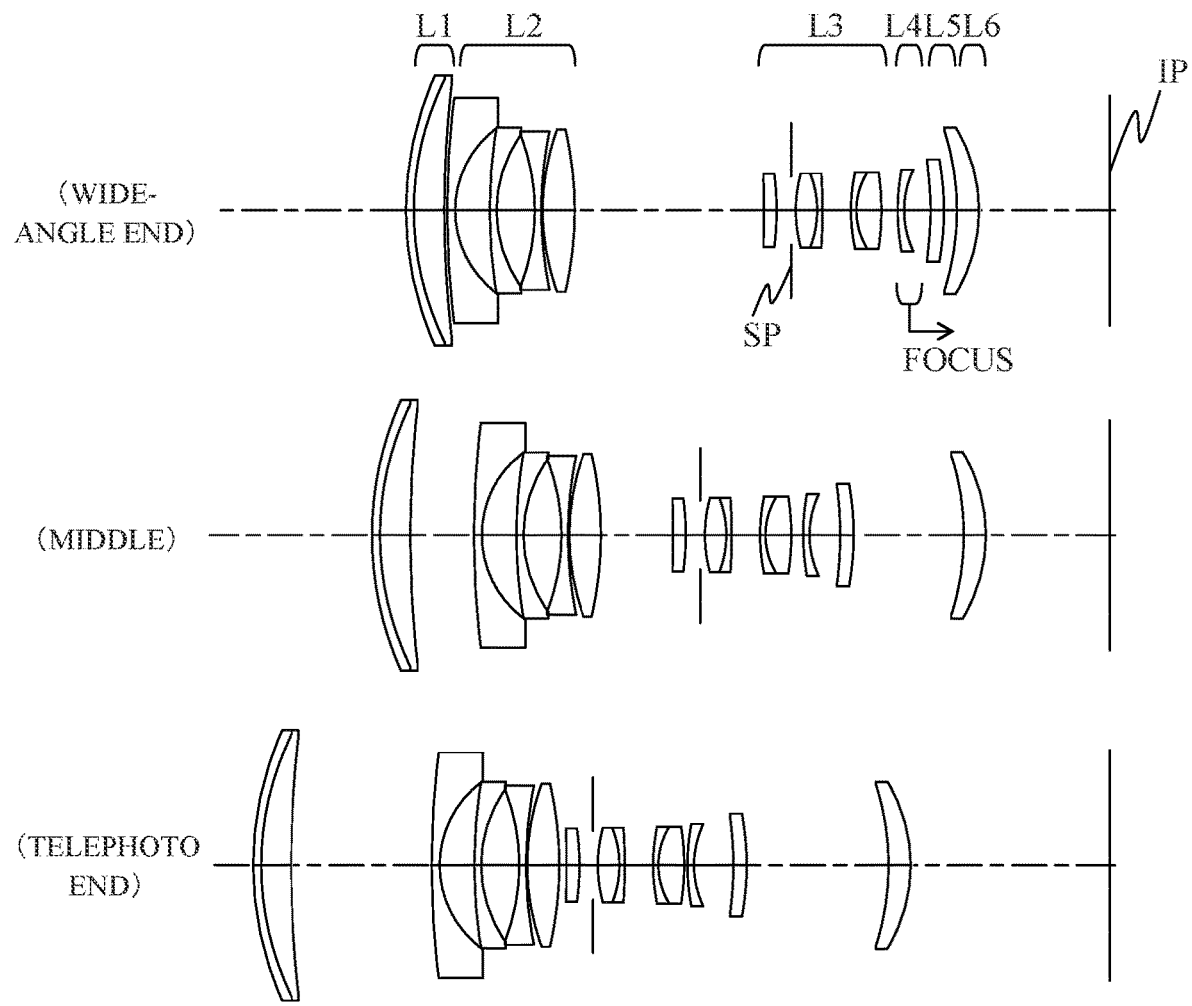
FIG. 9 is a sectional view illustrating a zoom lens at a wide-angle end, a middle zoom position, and a telephoto end, according to Example 5.
Figure 10A:
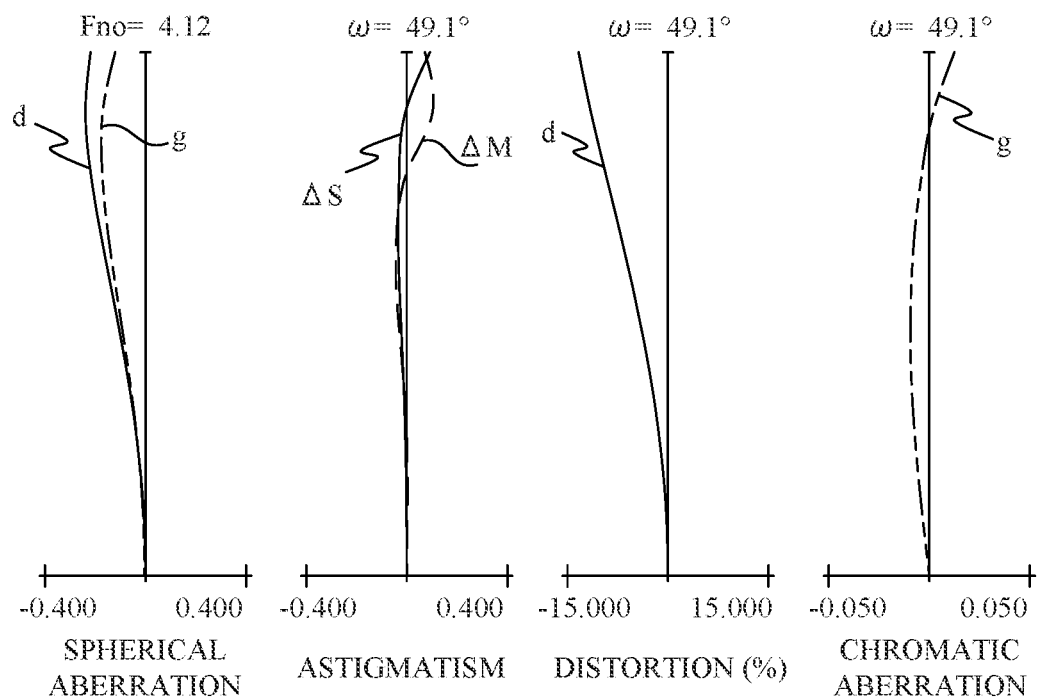
FIGS. 10A to 10C are aberration diagrams of the zoom lens at the wide-angle end, the middle zoom position, and the telephoto end, according to Example 5, respectively.
Figure 10B:
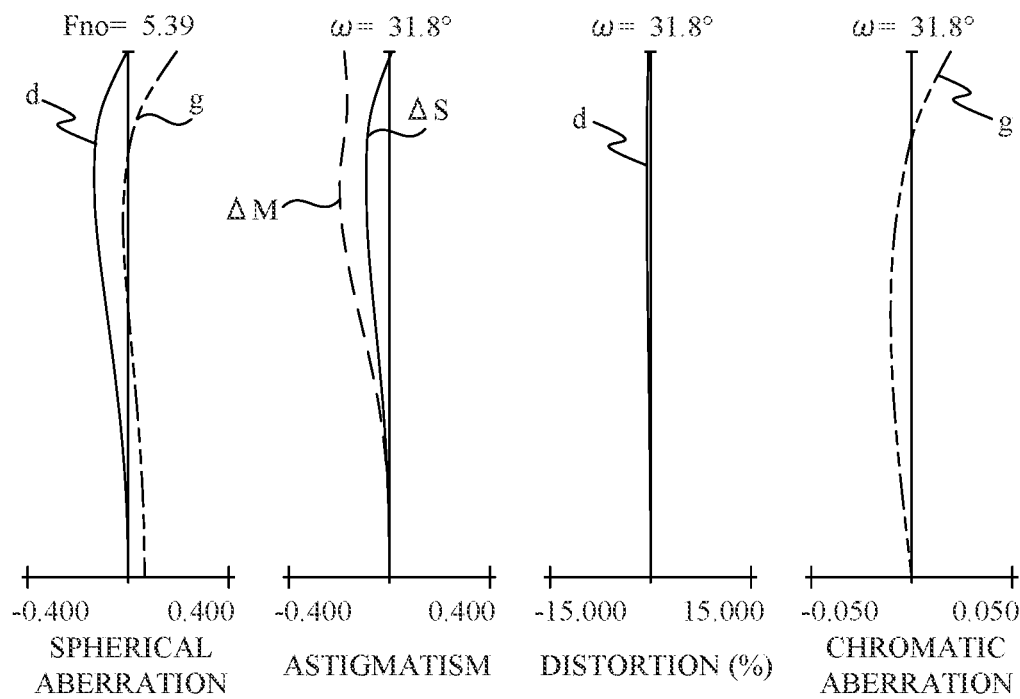
Figure 10C:
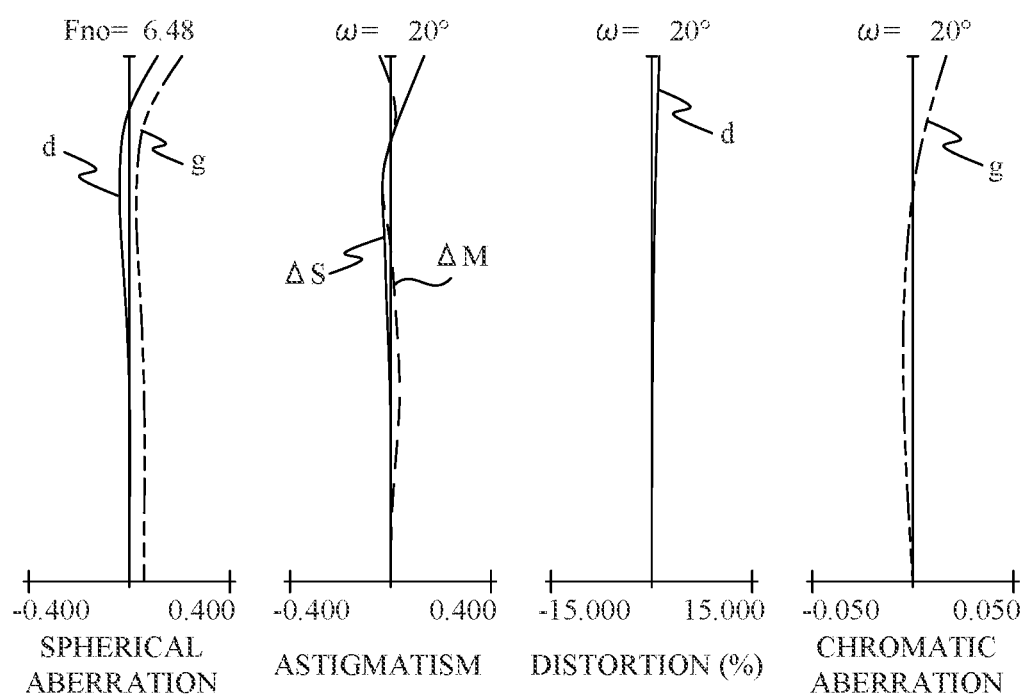

FIG. 9 is a sectional view illustrating a zoom lens at a wide-angle end, at a middle zoom position, and at a telephoto end, according to Example 5. FIGS. 10A to 10C are aberration diagrams of the zoom lens at the wide-angle end, the middle zoom position, and the telephoto end, according to Example 5, respectively. The zoom lens according to Example 5 has a zoom ratio of 3.2 and an aperture ratio of about 4.1 to 6.5 in an entire zoom area.

Figure 11:
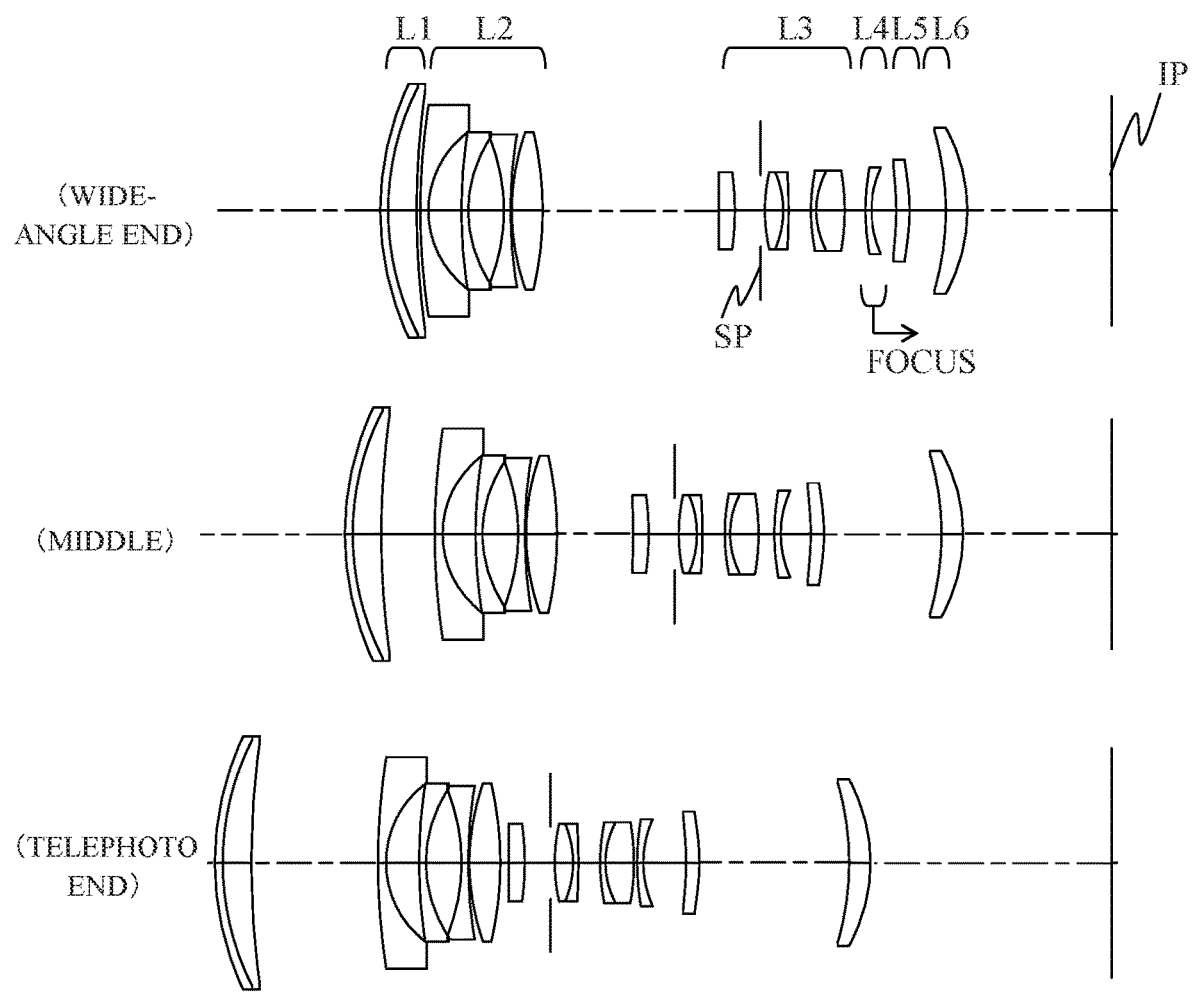
FIG. 11 is a sectional view illustrating a zoom lens at a wide-angle end, a middle zoom position, and a telephoto end, according to Example 6.
Figure 12A:
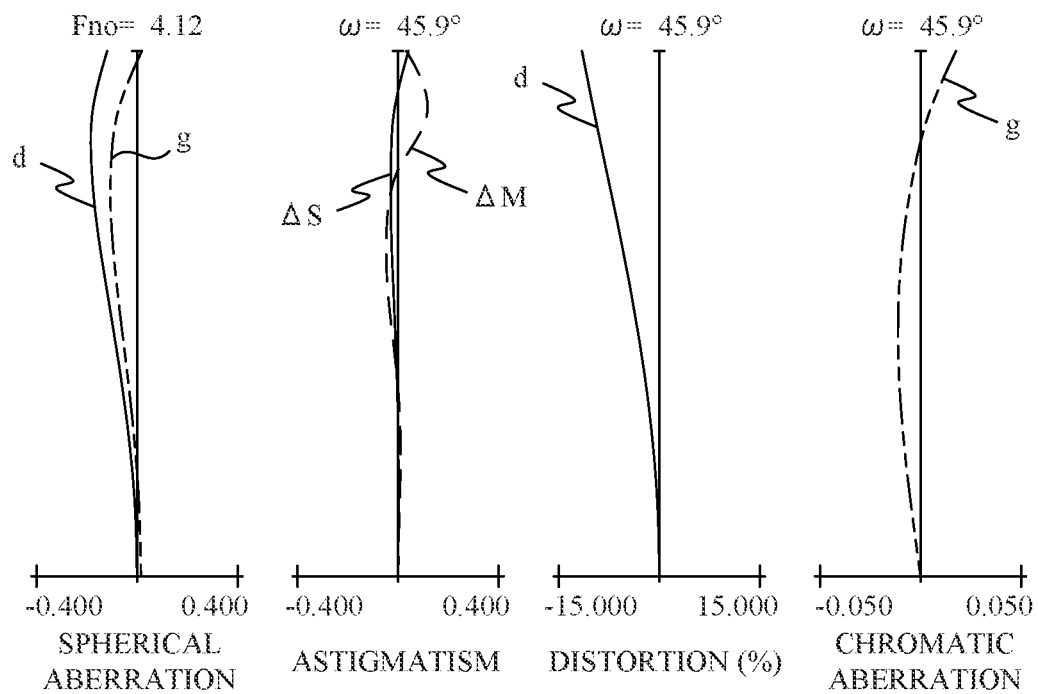
FIGS. 12A to 12C are aberration diagrams of the zoom lens at the wide-angle end, the middle zoom position, and the telephoto end, according to Example 6, respectively.
Figure 12B:
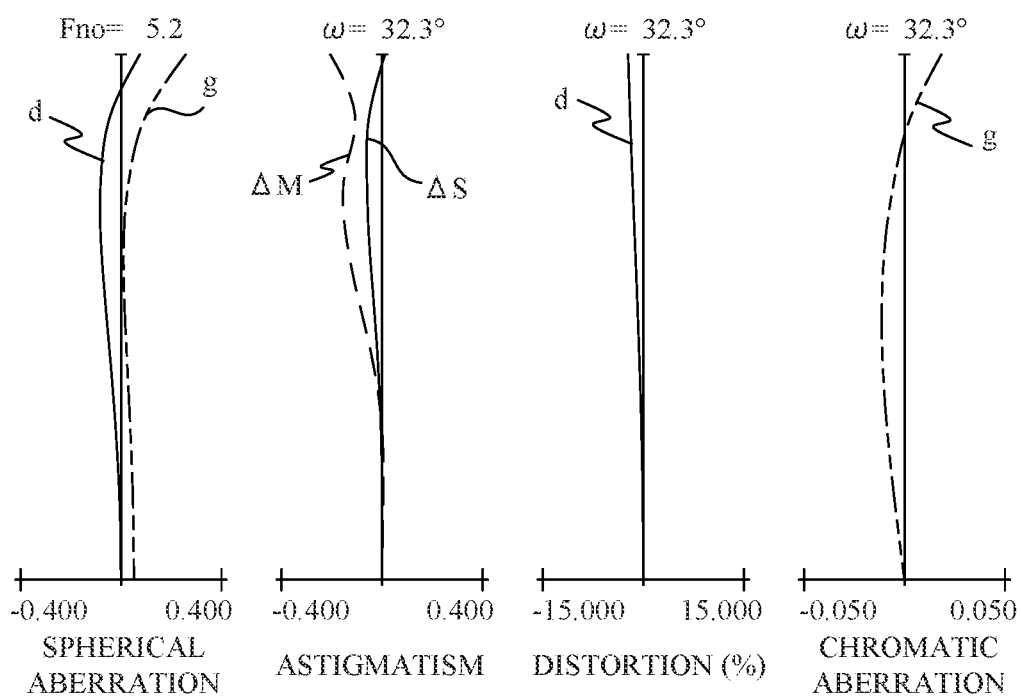
Figure 12C:
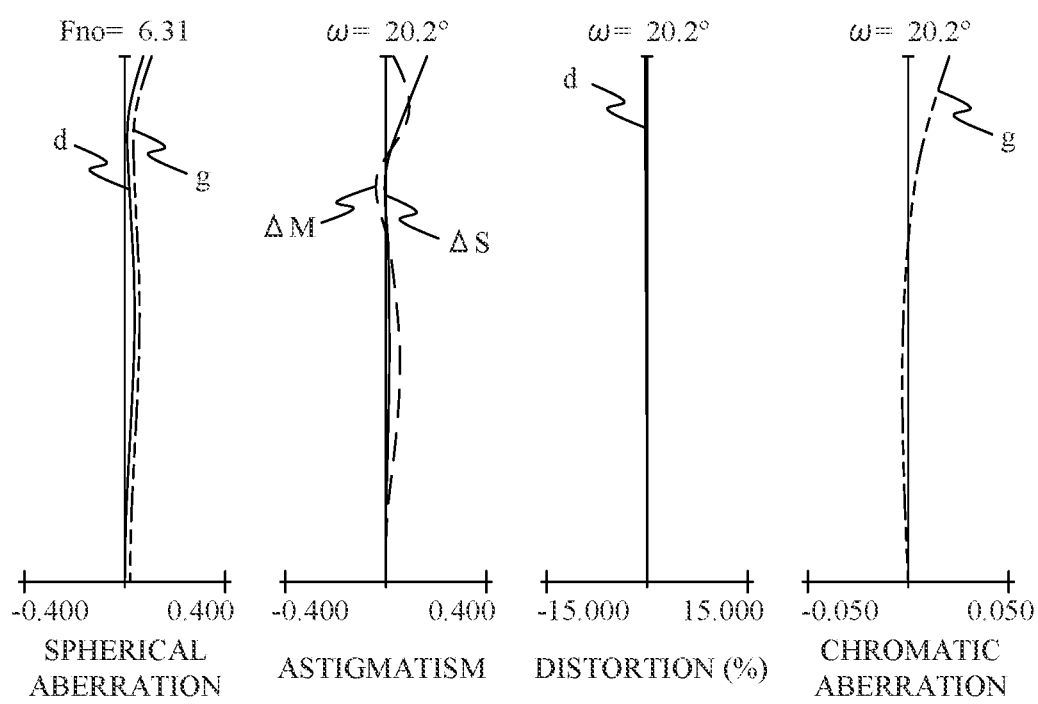

FIG. 11 is a sectional view illustrating a zoom lens at a wide-angle end, at a middle zoom position, and at a telephoto end, according to Example 6. FIGS. 12A to 12C are aberration diagrams of the zoom lens at the wide-angle end, the middle zoom position, and the telephoto end, according to Example 6, respectively. The zoom lens according to Example 6 has a zoom ratio of 2.9 and an aperture ratio of about 4.1 to 6.3 in an entire zoom area.

The zoom lens according to each example is an image-capturing optical system used for an image-capturing apparatus such as a digital video camera, a digital still camera, a broadcasting camera, a silver-halide film camera, and a surveillance camera. The zoom lens according to each example can be also used for a projection apparatus, that is, a projector.

In each lens sectional view, a left side is an object side (front) and a right side is an image side (rear). The zoom lens according to each example includes a plurality of lens units. In this specification, a lens unit is a group of one or a plurality of lenses that integrally move or stand still during zooming. That is, in the zoom lens according to each example, a distance between adjacent lens units varies during zooming from a wide-angle end to a telephoto end. The lens unit may be a single lens or may be a plurality of lenses. Further, the lens unit may include an aperture stop (a diaphragm).

In each lens sectional view, when i is order of a lens unit from the object side, Li indicates an i-th lens unit. SP represents an aperture stop that determines (limits) a light beam of an open F-number (Fno). FP represents a flare-cut stop which cuts unnecessary light. IP represents an image plane, on which an image-capturing plane of a solid-state image sensor (photoelectric conversion element) such as a CCD sensor or a CMOS sensor is placed when the zoom lens according to each example is used as an image-capturing optical system of a digital still camera or a digital video camera. When the zoom lens according to each example is used as an image-capturing optical system of a silver-halide film camera, a photosensitive plane corresponding to a film plane is placed on the image plane IP. An arrow related to focus indicates a moving direction of a lens unit in focusing from infinity to a short distance.

In a spherical aberration diagram, Fno represents an F-number and indicates spherical aberration amounts for a d-line (wavelength 587.6 nm) and a g-line (wavelength 435.8 nm). In an astigmatism diagram, ΔS represents an astigmatism amount on a sagittal image plane, and ΔM represents an astigmatism amount on a meridional image plane. A distortion diagram illustrates a distortion amount for the d-line. A chromatic aberration diagram illustrates a chromatic aberration amount for the g-line. ω represents an image-capturing half angle of view (°), which is an angle of view based on a light beam tracing value. In each of the following examples, the wide-angle end and the telephoto end refer to zoom positions when a lens unit for zooming is located at both ends of a movable range on an optical axis in terms of mechanism.

A description will now be given of a characteristic configuration of the zoom lens according to each example.

The zoom lens according to each example is a zoom lens consisting of four or more lens units including, in order from the object side to the image side, a first lens unit L1 having a positive refractive power, a second lens unit L2 having a negative refractive power, and a third lens unit L3 having a positive refractive power. During zooming from the wide-angle end to the telephoto end, the first lens unit L1 moves, a distance between the first lens unit L1 and the second lens unit L2 is widened, and a distance between the second lens unit L2 and the third lens unit L3 is narrowed. The first lens unit L1 consists of a single positive lens, and the second lens unit L2 includes three single lens elements, each having a negative refractive power. The three single lens elements are arranged continuously in order from the object side to the image side. Further, on the image side of the third lens unit L3, a rear group which consists of one or more lens units is arranged.

The zoom lens according to each example satisfies the following inequalities (1) and (2):

$$1.715 < SFY < 10.0 \quad (1)$$

$$-7.5 < f1/f2 < -0.5 \quad (2)$$

Here, SFY is a shape factor of a single lens element Y (a second single lens element) adjacent to a single lens element X arranged on the most object side (a first single lens element) among the above three single lens elements continuously arranged in the second lens unit L2. f1 is a focal length of the first lens unit L1. f2 is a focal length of the second lens unit L2.

The zoom lens according to each example comprises the first to third lens units L1 to L3 having positive, negative, and positive refractive powers arranged in order from the object side to the image side, in order to reduce an overall lens length at the wide-angle end and to satisfactorily correct aberrations over an entire zoom range. The zoom lens according to each example consists of at least four lens units to effectively correct spherical aberrations and coma aberrations generated in the first lens unit L1 and the second lens unit L2. Further, the zoom lens according to each example is a so-called positive-lead-type zoom lens in which the first lens unit L1 has the positive refractive power, an incident height of an axial light beam is suppressed for each lens element on the image side of the second lens unit L2, and a size of the zoom lens in a radial direction is reduced.

Further, in the zoom lens according to each example, in order to ensure miniaturization and high zoom ratio, the zooming is performed by changing a distance between each lens unit so that the distance between the first lens unit L1 and the second lens unit L2 at the telephoto end is wider than that at the wide-angle end, and the distance between the second lens unit L2 and the third lens unit L3 at the telephoto end is narrower than that at the wide-angle end.

The first lens unit L1 consists of the single positive lens. With this configuration, it is possible to achieve the miniaturization and a light weight by reducing the number of lens components of the first lens unit L1 having a large lens diameter. Further, the height of the light beam emitted from the first lens unit L1 can be lowered, and various aberrations such as spherical aberration and coma aberration can be satisfactorily corrected.

The second lens unit L2 includes the three single lens elements, each having a negative refractive power, and the three single lens elements being continuously arranged from the object side to the image side. Here, the single lens element is, in a case of a composite optical element (referred to as a hybrid aspherical surface or a replica aspherical surface) such as a replica resin layer, includes the resin layer. Specifically, an element including a resin layer having a thickness on the optical axis of 0.3 mm or less (0.15 mm in Example 4) formed on the object side of a third lens element in numerical data of Example 4 described later is the single lens element. In a case of specifying materials, the resin layer is not considered. With this configuration of the second lens unit L2, while the refractive power of the second lens unit L2 is increased, the curvature of field and lateral chromatic aberration in the wide-angle range and the spherical aberration in the telephoto range which are generated in the second lens unit L2 are corrected, and an increase in an effective diameter of a front lens, which is a problem due to the wider angle, is suppressed. By arranging a negative lens on the most object side of the second lens unit L2, a power arrangement in the second lens unit L2 can be a retrofocus type, and the curvature of field and coma aberration in the wide-angle range can be satisfactorily corrected.

The inequality (1) defines the shape factor of the single lens element Y adjacent to the single lens element X arranged on the most object side among the three single lens elements having the negative refractive powers and continuously arranged in the second lens unit L2, and is for satisfactorily correcting the curvature of field and lateral chromatic aberration in the wide-angle range. Here, the shape factor SF of a lens element is defined by the following equation, where a radius of curvature of a lens surface on the object side is R1 and a radius of curvature of a lens surface on the image side is R2.

$$SF = sgn(f)(R2+R1)/(R2-R1)$$

In a case where the lens element has an aspherical shape, the shape factor means a base R (a radius of a reference quadric surface). In a case where the lens element includes a composite optical element such as a replica resin layer, the shape factor is calculated based on a radius of curvature of the resin layer. sgn means a sign function, and f means a focal length of the lens element. That is, a sign of the sign function is "+" in a case of a positive lens and "−" in a case of a negative lens.

If SFY is larger than the upper limit of the inequality (1), the negative single lens element Y has a meniscus shape having a strong convexity on the object side, and it becomes difficult to satisfactorily correct the lateral chromatic aberration in the wide-angle range. Further, when a desired angle of view at the wide-angle end is secured, the overall lens length increases. If SFY is smaller than the lower limit of the inequality (1), a radius of curvature on the object side becomes large, which causes an increase in the curvature of field and astigmatic difference in a wide-angle range.

The inequality (2) defines the focal length f1 of the first lens unit L1 by the focal length f2 of the second lens unit L2, and is for maintaining an appropriate zoom ratio and downsizing the entire zoom lens system. In a case where a desired magnification is secured while achieving the wider angle, a share of refractive power ratio between the first lens unit L1 and the second lens unit L2 must be set appropriately. Further, in order to satisfactorily correct the spherical aberration in the telephoto range, it is necessary to appropriately secure the refractive power of the first lens unit L1 within a range in which the aberration can be corrected. If f1/f2 is larger than the upper limit of the inequality (2), the refractive power of the first lens unit L1 becomes large, which is advantageous for the miniaturization but is disadvantageous for the wider angle, and it becomes difficult to correct the curvature of field in the wide-angle range. If f1/f2 is smaller than the lower limit of the inequality (2), since the refractive power of the first lens unit L1 becomes small, the overall length of the entire zoom lens system increases, and it becomes difficult to secure a peripheral light amount.

The numerical ranges of the inequalities (1) and (2) may be set as follows.

$$1.715 < SFY < 5.0 \quad (1a)$$

$$-7.3 < f1/f2 < -2.0 \quad (2a)$$

By satisfying the inequality (1a), it is easy to suppress variations of the lateral chromatic aberration for each wavelength while suppressing the astigmatic difference in the wide-angle range. By satisfying the inequality (2a), it is possible to shorten the overall lens length while suppressing the coma aberration in the telephoto range.

The numerical ranges of the inequalities (1) and (2) may be set as follows.

$$1.715 < SFY < 3.0 \quad (1b)$$

$$-7.2 < f1/f2 < -4.3 \quad (2b)$$

By appropriately configuring each lens unit as described above and simultaneously satisfying the inequalities (1) and (2), it is possible to realize the compact zoom lens which satisfactorily corrects various aberrations such as spherical aberration, coma aberration, and curvature of field, and includes a super wide-angle range in which a half angle of view at the wide-angle end exceeds 45 degrees.

Additionally, the zoom lens according to each example may adopt the following configuration as another aspect.

The zoom lens according to each example as another aspect is a zoom lens consisting of four or more lens units including, in order from the object side to the image side, a first lens unit L1 having a positive refractive power, a second lens unit L2 having a negative refractive power, and a third lens unit L3 having a positive refractive power. During zooming from the wide-angle end to the telephoto end, the first lens unit L1 moves, a distance between the first lens unit L1 and the second lens unit L2 is widened, and a distance between the second lens unit L2 and the third lens unit L3 is narrowed. The first lens unit L1 consists of one element lens having a positive refractive power, and the second lens unit L2 includes three single lens elements, each having a negative refractive power. The three single lens elements are arranged continuously in order from the object side to the image side. Further, on the image side of the third lens unit L3, a rear group which consists of one or more lens units is arranged.

The zoom lens according to each example as another aspect satisfies the following inequalities (1), (2), and (3):

$$1.715 < SFY < 10.0 \quad (1)$$

$$-7.5 < f1/f2 < -0.5 \quad (2)$$

$$0.5 < fZ/f2 < 1.96 \quad (3)$$

Here, SFY, f1, and f2 are described above. fZ is a focal length of a single lens element Z arranged on the most image side (a third single lens element) among the three single lens elements, each having a negative refractive power, continuously arranged in the second lens unit L2.

Among the configurations and conditions of the above zoom lens, explanations of parts that overlap with the configurations and conditions of the zoom lens described first will be omitted.

The first lens unit L1 consists of the one element lens having the positive refractive power. Here, the one element lens means a single lens or a cemented lens obtained by cementing a plurality of lenses. With this configuration, a thickness on the optical axis of the first lens unit L1 having a large lens diameter is reduced, and an increase in a front lens diameter, which is a problem in a zoom lens including a super wide-angle range, is suppressed. Further, the height of the light beam emitted from the first lens unit L1 can be lowered, and various aberrations such as spherical aberration and coma aberration can be satisfactorily corrected.

The inequality (3) defines the focal length fZ of the singe lens element Z arranged on the most image side among the three single lens elements, each having the negative refractive power, continuously arranged in the second lens unit L2 by the focal length f2 of the second lens unit L2. This is for satisfactorily correcting the lateral chromatic aberration in the wide-angle range and achieving the miniaturization. If fZ/f2 is larger than the upper limit of the inequality (3), a refractive power sharing of the single lens element Z becomes small with respect to the refractive power of the second lens unit L2, the refractive power sharing of the single lens elements X and Y increases, and it becomes difficult to correct the curvature of field in the wide-angle range. If fZ/f2 is smaller than the lower limit of the inequality (3), the refractive power sharing of the single lens element Z becomes large with respect to the refractive power of the second lens unit L2, which is advantageous for correcting the lateral chromatic aberration but causes an increase in the front lens diameter.

The numerical ranges of the inequalities (1), (2), and (3) may be set as follows.

$$1.715 < SFY < 5.0 \quad (1a)$$

$$-7.3 < f1/f2 < -2.0 \quad (2a)$$

$$1.0 < fZ/f2 < 1.956 \quad (3a)$$

By satisfying the inequality (1a), it is easy to suppress variations of the lateral chromatic aberration for each wavelength while suppressing the astigmatic difference in the wide-angle range. By satisfying the inequality (2a), it is possible to shorten the overall lens length while suppressing the coma aberration in the telephoto range. By satisfying the inequality (3a), it is possible to shorten the overall lens length while suppressing variations of the spherical aberration for each wavelength in the telephoto range.

The numerical ranges of the inequalities (1), (2), and (3) may be set as follows.

$$1.715 < SFY < 3.0 \quad (1b)$$

$$-7.2 < f1/f2 < -4.3 \quad (2b)$$

$$1.2 < fZ/f2 < 1.952 \quad (3b)$$

By appropriately configuring each lens unit as described above and simultaneously satisfying the inequalities (1), (2), and (3), it is possible to realize the compact zoom lens which satisfactorily corrects various aberrations such as spherical aberration, coma aberration, and curvature of field, and includes the super wide-angle range in which a half angle of view at the wide-angle end exceeds 45 degrees.

A description will now be given of conditions that may be satisfied by the zoom lens according to each example. The zoom lens according to each example may satisfy at least one of following inequalities (4) to (12).

$$1.0 < SFX < 3.0 \quad (4)$$

$$0.6 < SF1 < 3.0 \quad (5)$$

$$1.19 < nX/nZ < 1.31 \quad (6)$$

$$0.35 < fX/fY < 1.50 \quad (7)$$

$$0.70 < fX/f2 < 2.20 \quad (8)$$

$$0.90 < skw/fw < 1.45 \quad (9)$$

$$5.1 < f1/fw < 14.0 \quad (10)$$

$$0.38 < f3/ft < 2.00 \quad (11)$$

$$0.3 < V < 1.0 \quad (12)$$

Here, SFX is a shape factor of the single lens element X. SF1 is a shape factor of the single positive lens of the first lens unit L1 or a shape factor of the one element lens having the positive refractive power of the first lens unit L1. nX and nZ are refractive indexes of the single lens elements X and Z for the d-line, respectively. fX and fY are focal lengths of the single lens elements X and Y of the second lens unit L2, respectively. skw is a back focus of the zoom lens at the wide-angle end. fw is a focal length of the zoom lens at the wide-angle end. f3 is a focal length of the third lens unit L3. ft is a focal length of the zoom lens at the telephoto end. V is a third-order aberration coefficient of distortion at the wide-angle end.

The inequality (4) defines the shape factor of the single lens element X, and is for achieving the miniaturization while suppressing the curvature of field and astigmatic difference in the wide-angle range. When SFX is 1, the single lens element X has a flat concave shape having a concave surface on the image side. If SFX is larger than the upper limit of the inequality (4), it becomes difficult to satisfactorily correct the curvature of field and astigmatism on a wide-angle side, and a zoom fluctuation of the curvature of field becomes large. If SFX is smaller than the lower limit of the inequality (4), an angle-of-view fluctuation of the lateral chromatic aberration on the wide-angle side becomes large.

The inequality (5) defines the shape factor of the single positive lens of the first lens unit L1 or the shape factor of the one element lens having the positive refractive power of the first lens unit L1. The inequality (5) is for forming the first lens unit L1 into a shape having a strong convex surface on the object side and satisfactorily correcting the spherical aberration and coma aberration on a telephoto side. By forming the first lens unit L1 to have the shape having the strong convex surface on the object side, an incident angle and a refraction angle can be reduced with respect to off-axis light beams incident from the object side, and occurrence of the astigmatism over the entire zoom range can be suppressed. If SF1 is larger than the upper limit of the inequality (5), a meniscus shape of the first lens unit L1 becomes strong, and it becomes difficult to correct the spherical aberration and coma aberration on the telephoto side. If SF1 is smaller than the lower limit of the inequality (5), the curvature of field and astigmatic difference on the wide-angle side become large.

The inequality (6) defines a ratio of the refractive indexes nX and nZ of the single lens elements X and Z for the d-line, and is for downsizing the entire lens system and securing high imaging performance in the wide-angle range. Due to characteristics of glass, as a refractive index increases, an Abbe number decreases, which tends to lead to insufficient correction of the chromatic aberration. For this reason, if an attempt is made to suppress the chromatic aberration to a desired degree, the refractive power must be weakened, which leads to an increase in the overall lens length. Further, in a lens of the retrofocus type, in a case where the number of lens components is reduced to achieve the miniaturization, a Petzval sum tends to be a negative value, the image plane is tilted to an over side, and the astigmatic difference becomes large. For this reason, it is important to optimize a refractive index of a negative lens and to satisfactorily correct the curvature of field and astigmatic difference. If nX/nZ is larger than the upper limit of the inequality (6), it is advantageous for image plane correction, but it becomes difficult to correct the lateral chromatic aberration. If nX/nZ is smaller than the lower limit of the inequality (6), it is advantageous for suppressing the lateral chromatic aberration in the wide-angle range, but it is disadvantageous for the wider angle, which leads to an increase in the front lens diameter.

The inequality (7) defines a ratio of the focal lengths of the single lens element X and the single lens element Y, and is for optimizing the refractive power sharing in the second lens unit L2 and for achieving the miniaturization while suppressing the curvature of field and astigmatic difference. If fX/fY is larger than the upper limit of the inequality (7), the refractive power of the single lens element X is weak, which causes an increase in the front lens diameter. If fX/fY is smaller than the lower limit of the inequality (7), the refractive power of the single lens element X becomes strong, which is advantageous for the miniaturization, but it becomes difficult to correct the curvature of field and astigmatism.

The inequality (8) defines the focal length fX of the single lens element X by the focal length f2 of the second lens unit L2, and is for suppressing the curvature of field in the wide-angle range and the coma aberration in the telephoto range. If fX/f2 is larger than the upper limit of the inequality (8), the refractive power sharing of the single lens element X becomes small with respect to the refractive power of the second lens unit L2, the refractive power sharing of the single lens element Y increases, and it becomes difficult to correct the curvature of field in the wide-angle range. If fX/f2 is smaller than the lower limit of the inequality (8), the refractive power sharing of the single lens element X becomes large with respect to the refractive power of the second lens unit L2, and a fluctuation of the coma aberration for each image height from a zoom intermediate range to the telephoto range becomes large.

The inequality (9) defines the back focus skw at the wide-angle end by the focal length fw at the wide-angle end, and defines a so-called retro ratio. If skw/fw is smaller than the lower limit of the inequality (9), the back focus becomes short, and it becomes difficult to arrange a shutter member and the like. If skw/fw is larger than the upper limit of the inequality (9), the back focus becomes long, it becomes difficult to correct the curvature of field in the wide-angle range, and the number of lenses increases.

The inequality (10) defines the focal length f1 of the first lens unit L1 by the focal length fw at the wide-angle end, and optimizes a zooming ratio sharing while achieving the miniaturization. By setting a desired refractive power to the first lens unit L1, a moving amount of the first lens unit L1 during zooming can be suppressed. If f1/fw is larger than the upper limit of the inequality (10), the refractive power of the first lens unit L1 becomes weak, and a variable power is weakened. When the moving amount of the first lens unit L1 during zooming is increased to compensate for the variable power, the overall lens length increases at the telephoto end. Further, it is necessary to secure the zooming ratio sharing in lens units after the third lens unit L3, and in that case, various aberrations such as spherical aberration and coma aberration on the telephoto side occur frequently. The number of lenses and the number of aspherical lenses increase due to aberration correction, and robustness against manufacturing errors tends to be lost. If f1/fw is smaller than the lower limit of the inequality (10) and the refractive power of the first lens unit L1 is too strong, a large amount of the spherical aberration occurs from the first lens unit L1 on the telephoto side.

The inequality (11) defines the focal length f3 of the third lens unit L3 by the focal length ft at the telephoto end, and is for ensuring the zooming ratio sharing after satisfactorily correcting the spherical aberration and the coma aberration. If f3/ft is larger than the upper limit of the inequality (11), the refractive power of the third lens unit L3 becomes weak, the variable power is weakened, and the moving amount of the third lens unit L3 is increased during zooming. If f3/ft is smaller than the lower limit of the inequality (11), the refractive power of the third lens unit L3 becomes too strong, which causes the spherical aberration and coma aberration on the telephoto side, and the astigmatic difference in a center of an image area.

The inequality (12) defines the third-order aberration coefficient of the distortion at the wide-angle end, and is for appropriately correcting the curvature of field and astigmatism, and further suppressing deterioration of resolution due to stretching when correction of electronic distortion is performed. If V is larger than the upper limit of the inequality (12), the distortion becomes large, which is advantageous for the miniaturization, but the deterioration of the resolution due to the stretching becomes large. If V is smaller than the lower limit of the inequality (12), it becomes difficult to satisfactorily correct the curvature of field and lateral chromatic aberration.

The numerical ranges of the inequalities (4) to (12) may be set as follows.

$$1.1 < SFX < 2.0 \tag{4a}$$

$$0.8 < SF1 < 2.4 \tag{5a}$$

$$1.21 < nX/nZ < 1.29 \tag{6a}$$

$$0.40 < fX/fY < 1.30 \tag{7a}$$

$$0.75 < fX/f2 < 2.00 \tag{8a}$$

$$0.92 < skw/fw < 1.40 \tag{9a}$$

$$5.3 < f1/fw < 12.0 \tag{10a}$$

$$0.40 < f3/ft < 1.90 \tag{11a}$$

$$0.33 < V < 0.60 \tag{12a}$$

By satisfying the inequality (4a), correction of the curvature of field in the wide-angle range becomes more appropriate, and it is easy to correct the curvature of field even when the wider angle is achieved. By satisfying the inequality (5a), it becomes easy to correct the spherical aberration and coma aberration in the telephoto range. By satisfying the inequality (6a), it becomes easy to suppress a fluctuation of the lateral chromatic aberration due to zooming. By satisfying the inequality (7a), it becomes easy to suppress the zoom fluctuation of the curvature of field. By satisfying the inequality (8a), it becomes easy to suppress the coma aberration in the telephoto range, particularly variations for each wavelength. By satisfying the inequality (9a), the overall lens length at the wide-angle end, the front lens diameter, and the rear lens diameter become appropriate, and it is easy to realize the miniaturization of the entire lens system. By satisfying the inequality (10a), it becomes easy to achieve both correction of the lateral chromatic aberration on the wide-angle side and correction of the spherical aberration on the telephoto side. By satisfying the inequality (11a), the zooming ratio sharing of the third lens unit L3 is more optimized, and it becomes easy to suppress a zooming fluctuation of the coma aberration. By satisfying the inequality (12a), it becomes easy to achieve both the miniaturization of the front lens diameter and the securing of a resolving power of a marginal angle.

The numerical ranges of the inequalities (4) to (12) may be set as follows.

$$1.2 < SFX < 1.7 \tag{4b}$$

$$1.0 < SF1 < 2.1 \tag{5b}$$

$$1.23 < nX/nZ < 1.27 \tag{6b}$$

$$0.44 < fX/fY < 1.11 \tag{7b}$$

$$0.85 < fX/f2 < 1.78 \tag{8b}$$

$$0.94 < skw/fw < 1.35 \tag{9b}$$

$$5.5 < f1/fw < 10.0 \tag{10b}$$

$$0.42 < f3/ft < 1.86 \tag{11b}$$

$$0.36 < V < 0.51 \tag{12b}$$

A description will now be given of configurations that may be satisfied by the zoom lens according to each example.

The first lens unit L1 may consist of a positive single lens or a cemented lens of a negative lens and a positive lens. This makes it easy to satisfactorily correct the lateral chromatic aberration over the entire zoom range and to satisfactorily correct the spherical aberration and axial chromatic aberration on the telephoto side.

The second lens unit L2 may consist of the three single lens elements, each having the negative refractive power, and one single lens element having a positive refractive power. By minimizing the number of positive single lens elements to one, both achromatization and miniaturization in the second lens unit L2 are achieved.

A relative position of the second lens unit L2 with respect to an image plane position may be located closer to the object side than the wide-angle end at the telephoto end. As a result, a position of an entrance pupil can be arranged on the object side in the wide-angle range, and an increase in the front lens diameter due to the wider angle can be suppressed. In addition, it becomes easy to satisfactorily correct a fluctuation of the curvature of field due to zooming.

The third lens unit L3 may include a single lens which is arranged on the most object side of the third lens unit L3 and is convex on the object side, the single lens having a positive refractive power. The height of the light beam incident from the second lens unit L2 of the main variable power to the third lens unit L3 is high, which causes high-order spherical aberration and coma aberration. For this reason, in order to effectively suppress occurrence of the spherical aberration and coma aberration, on the most object side of the third lens unit L3, the single lens convex on the object side and having the positive refractive power is arranged. This makes it easy to secure the positive refractive power required to converge the light beam emitted by the second lens unit L2.

The aperture stop SP may be arranged in the third lens unit L3. In order to secure a desired magnification and achieve the miniaturization of the entire system, it is important to minimize the distance between the second lens unit L2 and the third lens unit L3 at the telephoto end. By adopting this configuration, it becomes easy.

In a lens unit arranged on the most image side, a lens arranged on the most image side may be a positive lens convex to the image side. This makes it relatively easy to secure the back focus, and it is possible to suppress condensing of the unnecessary light (ghost) caused by the image sensor.

The rear group may have at least one aspherical surface in order to achieve the miniaturization while effectively correcting the curvature of field at the wide-angle end.

A detailed description will now be given of the zoom lens according to each example.

In Example 1 shown in FIG. 1, L1 is the first lens unit having the positive refractive power, L2 is the second lens unit having the negative refractive power, L3 is the third lens unit having the positive refractive power, L4 is the fourth lens unit having the negative refractive power, L5 is the fifth lens unit having the positive refractive power, and L6 is the sixth lens unit having the positive refractive power. In the zoom lens according to Example 1, the first lens unit L1 monotonically moves to the object side during zooming from the wide-angle end to the telephoto end. Then, each lens unit moves so that the distance between the first lens unit L1 and the second lens unit L2 at the telephoto end is wider than that at the wide-angle end, and the distance between the second lens unit L2 and the third lens unit L3 at the telephoto end is narrower than that at the wide-angle end. During focusing, the fourth lens unit L4 moves.

In Example 2 shown in FIG. 3, L1 is the first lens unit having the positive refractive power, L2 is the second lens unit having the negative refractive power, L3 is the third lens unit having the positive refractive power, L4 is the fourth lens unit having the positive refractive power, L5 is the fifth lens unit having the negative refractive power, L6 is the sixth lens unit having the positive refractive power, and L7 is the seventh lens unit having the positive refractive power. In the zoom lens according to Example 2, the first lens unit L1 monotonically moves to the object side during zooming from the wide-angle end to the telephoto end. Then, each lens unit moves so that the distance between the first lens unit L1 and the second lens unit L2 at the telephoto end is wider than that at the wide-angle end, the distance between the second lens unit L2 and the third lens unit L3 at the telephoto end is narrower than that at the wide-angle end, and the distance between the third lens unit L3 and the fourth lens unit L4 at the telephoto end is wider than that at the wide-angle end. During focusing, the fifth lens unit L5 moves.

In Example 3 shown in FIG. 5, L1 is the first lens unit having the positive refractive power, L2 is the second lens unit having the negative refractive power, L3 is the third lens unit having the positive refractive power, LA is the fourth lens unit having the negative refractive power, L5 is the fifth lens unit having the positive refractive power, L6 is the sixth lens unit having the negative refractive power, L7 is the seventh lens unit having the positive refractive power, and L8 is the eighth lens unit having the positive refractive power. In the zoom lens according to Example 3, the first lens unit L1 monotonically moves to the object side during zooming from the wide-angle end to the telephoto end. Then, each lens unit moves so that the distance between the first lens unit L1 and the second lens unit L2 at the telephoto end is wider than that at the wide-angle end, and the distance between the second lens unit L2 and the third lens unit L3 at the telephoto end is narrower than that at the wide-angle end. During focusing, the sixth lens unit L6 moves.

In Example 4 shown in FIG. 7, L1 is the first lens unit having the positive refractive power, L2 is the second lens unit having the negative refractive power, L3 is the third lens unit having the positive refractive power, L4 is the fourth lens unit having the positive refractive power, L5 is the fifth lens unit having the negative refractive power, L6 is the sixth lens unit having the negative refractive power, and L7 is the seventh lens unit having the positive refractive power. In the zoom lens according to Example 4, the first lens unit L1 monotonically moves to the object side during zooming from the wide-angle end to the telephoto end. Then, each lens unit moves so that the distance between the first lens unit L1 and the second lens unit L2 at the telephoto end is wider than that at the wide-angle end, the distance between the second lens unit L2 and the third lens unit L3 at the telephoto end is narrower than that at the wide-angle end, and the distance between the third lens unit L3 and the fourth lens unit L4 at the telephoto end is narrower than that at the wide-angle end. During focusing, the fifth lens unit L5 moves.

In Examples 5 and 6 shown in FIGS. 9 and 11, L1 is the first lens unit having the positive refractive power, L2 is the second lens unit having the negative refractive power, L3 is the third lens unit having the positive refractive power, L4 is the fourth lens unit having the negative refractive power, L5 is the fifth lens unit having the negative refractive power, and L6 is the sixth lens unit having the positive refractive power. In the zoom lens according to each of Examples 5 and 6, the first lens unit L1 monotonically moves to the object side during zooming from the wide-angle end to the telephoto end. Then, each lens unit moves so that the distance between the first lens unit L1 and the second lens unit L2 at the telephoto end is wider than that at the wide-angle end, the distance between the second lens unit L2 and the third lens unit L3 at the telephoto end is narrower than that at the wide-angle end, and the distance between the third lens unit L3 and the fourth lens unit L4 at the telephoto end is narrower than that at the wide-angle end. During focusing, the fourth lens unit L4 moves.

Numerical examples 1 to 6 corresponding to Examples 1 to 6, respectively, will be illustrated below.

In surface data of each numerical example, r represents a radius of curvature of each optical surface, and d (mm) represents an on-axis interval (a distance on the optical axis) between an m-th surface and an (m+1)-th surface, where m is a number of a surface counted from the light incident side. nd represents a refractive index of each optical element for the d-line, and vd represents an Abbe number of the optical element. The Abbe number vd of a certain material is calculated as follows:

$$vd = (Nd-1)/(NF-NC),$$

where Nd, NF, and NC are refractive indexes for the d-line (587.6 nm), the F-line (486.1 nm), and the C-line (656.3 nm) in the Fraunhofer lines In each numerical example, d, focal length (mm), F-number, and half angle of view (°) are all values when the zoom lens of each example focuses on an infinity object. The "back focus (BF)" is a distance on the optical axis from the final lens surface (the lens surface closest to the image plane) to a paraxial image plane in terms of an air-equivalent length. The "overall lens length" is a length obtained by adding the back focus to a distance on the optical axis from the frontmost surface (lens surface closest to the object) to the final surface. The "lens unit" may include a single lens or a plurality of lenses.

If the optical surface is aspheric, an asterisk * is attached to a right side of a surface number. The aspherical shape is expressed as follows:

$$x = (h^2/R)/[1+\{1-(1+k)(h/R)^2\}^{1/2}] + A4 \times h^4 + A6 \times h^6 + A8 \times h^8 + A10 \times h^{10} + A12 \times h^{12},$$

where x is a displacement amount from a surface vertex in the optical axis direction, h is a height from the optical axis in a direction orthogonal to the optical axis, R is a paraxial radius of curvature, k is a conical constant, and A4, A6, A8, A10, and A12 are aspherical coefficients of respective orders. In addition, "e±XX" in each aspherical coefficient means "$\times 10^{\pm XX}$".

Numerical Example 1

UNIT: mm
SURFACE DATA

| Surface No. | r | d | nd | vd |
|---|---|---|---|---|
| 1 | 65.219 | 4.71 | 1.62299 | 58.1 |
| 2 | 282.412 | (variable) | | |
| 3 | 140.410 | 1.50 | 1.87070 | 40.7 |
| 4 | 17.508 | 4.66 | | |
| 5 | 43.349 | 1.30 | 1.77250 | 49.6 |
| 6 | 20.537 | 6.65 | | |
| 7 | −37.386 | 1.20 | 1.49700 | 81.6 |
| 8 | 53.630 | 0.25 | | |
| 9 | 35.855 | 5.36 | 1.91082 | 35.3 |
| 10 | −78.718 | (variable) | | |
| 11 | −196.351 | 2.90 | 1.59282 | 68.6 |
| 12 | −46.465 | 2.94 | | |
| 13(diaphragm) | ∞ | 0.99 | | |
| 14 | 32.882 | 3.59 | 1.55032 | 75.5 |
| 15 | −17.323 | 1.00 | 1.80420 | 46.5 |
| 16 | −61.956 | 3.37 | | |
| 17 | 28.359 | 1.00 | 1.87070 | 40.7 |
| 18 | 13.927 | 6.28 | 1.59410 | 60.5 |
| 19 | −42.827 | (variable) | | |
| 20 | 31.004 | 1.20 | 1.87070 | 40.7 |
| 21 | 15.532 | (variable) | | |
| 22* | −48.387 | 2.50 | 1.53110 | 55.9 |
| 23* | −48.784 | (variable) | | |
| 24 | −64.185 | 4.54 | 1.51742 | 52.2 |
| 25 | −34.142 | (variable) | | |
| Image plane | ∞ | | | |

ASPHERIC DATA

22nd surface

K = 0.00000e+000 A 4 = 1.70820e−005 A 6 = 1.17704e−006
A 8 = −1.93813e−008 A10 = 1.18524e−010

23rd surface

K = 0.00000e+000 A 4 = 2.23932e−005 A 6 = 7.39253e−007
A 8 = −9.96858e−009 A10 = 4.35328e−011

VARIOUS DATA
Zoom ratio 2.87

| | Wide-angle | Middle | Telephoto |
|---|---|---|---|
| Focal length | 18.50 | 32.06 | 53.01 |
| Fno | 4.11 | 5.27 | 6.48 |
| Half angle of view (°) | 49.17 | 34.18 | 22.02 |
| Image height | 18.50 | 21.64 | 21.64 |
| Overall lens length | 117.88 | 125.56 | 150.43 |
| BF | 19.52 | 17.08 | 24.90 |
| d 2 | 0.63 | 10.40 | 25.55 |
| d10 | 27.81 | 11.33 | 1.63 |
| d19 | 3.73 | 2.78 | 1.22 |
| d21 | 4.59 | 5.54 | 7.10 |
| d23 | 5.64 | 22.49 | 34.09 |
| d25 | 19.52 | 17.08 | 24.90 |

ZOOM LENS UNIT DATA

| Unit | Starting surface | Focal length |
|---|---|---|
| 1 | 1 | 135.00 |
| 2 | 3 | −25.86 |
| 3 | 11 | 23.31 |
| 4 | 20 | −37.08 |
| 5 | 22 | 9467.08 |
| 6 | 24 | 134.06 |

Numerical Example 2

UNIT: mm
SURFACE DATA

| Surface No. | r | d | nd | vd |
|---|---|---|---|---|
| 1 | 57.137 | 5.05 | 1.62041 | 60.3 |
| 2 | 181.038 | (variable) | | |
| 3 | 92.646 | 1.50 | 1.87070 | 40.7 |
| 4 | 18.435 | 5.04 | | |
| 5 | 53.487 | 1.30 | 1.77250 | 49.6 |
| 6 | 20.012 | 7.39 | | |
| 7 | −38.576 | 1.20 | 1.49700 | 81.6 |
| 8 | 66.841 | 0.25 | | |
| 9 | 38.597 | 5.51 | 1.91082 | 35.3 |
| 10 | −90.457 | (variable) | | |
| 11 | 135.230 | 2.47 | 1.59282 | 68.6 |
| 12 | −104.831 | (variable) | | |
| 13(diaphragm) | ∞ | 1.17 | | |
| 14 | 22.495 | 1.00 | 1.75500 | 52.3 |
| 15 | 14.326 | 4.05 | 1.55032 | 75.5 |
| 16 | −136.741 | 0.97 | | |
| 17 | 37.075 | 3.53 | 1.59282 | 68.6 |
| 18 | −17.869 | 1.00 | 1.88300 | 40.8 |
| 19 | −62.442 | (variable) | | |
| 20 | 40.861 | 1.20 | 1.87070 | 40.7 |
| 21 | 16.342 | (variable) | | |

-continued

| | | | | |
|---|---|---|---|---|
| 22* | −22.506 | 2.50 | 1.53110 | 55.9 |
| 23* | −17.759 | (variable) | | |
| 24 | −74.828 | 4.73 | 1.49700 | 81.6 |
| 25 | −36.656 | (variable) | | |
| Image plane | ∞ | | | |

ASPHERIC DATA

22nd surface $K = 0.00000e+000 \ A\ 4 = 5.20682e{-}005 \ A\ 6 = 5.88541e{-}007$
$A\ 8 = 4.66887e{-}009 \ A10 = -5.97942e{-}011$ 23rd surface $K = 0.00000e+000 \ A\ 4 = 4.72873e{-}005 \ A\ 6 = 3.63857e{-}007$
$A\ 8 = 4.30450e{-}009 \ A10 = -3.23834e{-}011$ VARIOUS DATA
Zoom ratio 2.92

| | Wide-angle | Middle | Telephoto |
|---|---|---|---|
| Focal length | 18.50 | 31.67 | 54.02 |
| Fno | 4.12 | 5.26 | 6.48 |
| Half angle of view (°) | 48.65 | 34.97 | 21.91 |
| Image height | 18.50 | 21.64 | 21.64 |
| Overall lens length | 121.60 | 129.93 | 156.78 |
| BF | 23.41 | 19.49 | 29.34 |
| d 2 | 0.69 | 9.30 | 24.76 |
| d10 | 29.53 | 12.55 | 0.36 |
| d12 | 3.66 | 4.49 | 5.66 |
| d19 | 2.96 | 2.20 | 0.84 |
| d21 | 4.64 | 5.41 | 6.76 |
| d23 | 6.84 | 26.62 | 39.18 |
| d25 | 23.41 | 19.49 | 29.34 |

ZOOM LENS UNIT DATA

| Unit | Starting surface | Focal length |
|---|---|---|
| 1 | 1 | 132.50 |
| 2 | 3 | −25.23 |
| 3 | 11 | 100.00 |
| 4 | 13 | 27.87 |
| 5 | 20 | −32.01 |
| 6 | 22 | 134.05 |
| 7 | 24 | 138.86 |

Numerical Example 3

UNIT: mm
SURFACE DATA

| Surface No. | r | d | nd | vd |
|---|---|---|---|---|
| 1 | 99.488 | 4.01 | 1.62299 | 58.1 |
| 2 | 787.505 | (variable) | | |
| 3 | 93.036 | 1.50 | 1.88100 | 40.1 |
| 4 | 21.560 | 4.33 | | |
| 5 | 67.274 | 1.30 | 1.77250 | 49.6 |
| 6 | 18.920 | 6.91 | | |
| 7 | −46.884 | 1.20 | 1.49700 | 81.6 |
| 8 | 49.769 | 0.25 | | |
| 9 | 34.412 | 5.29 | 1.91082 | 35.3 |
| 10 | −116.738 | (variable) | | |
| 11 | 25.538 | 3.01 | 1.80420 | 46.5 |
| 12 | 130.744 | 2.00 | | |
| 13(diaphragm) | ∞ | (variable) | | |
| 14 | 22.282 | 4.28 | 1.61772 | 49.8 |
| 15 | −25.543 | 0.70 | 1.90366 | 31.3 |
| 16 | 20.283 | (variable) | | |
| 17 | 26.540 | 0.90 | 1.87070 | 40.7 |
| 18 | 15.778 | 4.02 | 1.55032 | 75.5 |
| 19 | −53.046 | 0.50 | | |
| 20 | 48.504 | 3.69 | 1.90366 | 31.3 |

-continued

| | | | | |
|---|---|---|---|---|
| 21 | −128.074 | (variable) | | |
| 22 | 39.053 | 1.20 | 1.87070 | 40.7 |
| 23 | 18.982 | (variable) | | |
| 24* | −97.282 | 2.50 | 1.53110 | 55.9 |
| 25* | −63.100 | (variable) | | |
| 26 | −51.286 | 3.72 | 1.54072 | 47.2 |
| 27 | −36.730 | (variable) | | |
| Image plane | ∞ | | | |

ASPHERIC DATA24th surface $K = 0.00000e+000 \ A\ 4 = -5.69002e{-}005 \ A\ 6 = 6.85123e{-}007$
$A\ 8 = -1.19315e{-}008 \ A10 = 5.69105e{-}011$ 25th surface $K = 0.00000e+000 \ A\ 4 = -4.72971e{-}005 \ A\ 6 = 4.93848e{-}007$
$A\ 8 = -7.65618e{-}009 \ A10 = 3.03899e{-}011$ VARIOUS DATA
Zoom ratio 2.89

| | Wide-angle | Middle | Telephoto |
|---|---|---|---|
| Focal length | 18.58 | 32.05 | 53.71 |
| Fno | 4.12 | 5.11 | 6.48 |
| Half angle of view (°) | 48.12 | 34.05 | 21.77 |
| Image height | 18.50 | 21.64 | 21.64 |
| Overall lens length | 116.12 | 122.10 | 149.69 |
| BF | 17.48 | 18.34 | 18.85 |
| d 2 | 0.68 | 12.12 | 30.02 |
| d10 | 29.09 | 10.59 | 1.20 |
| d13 | 3.27 | 2.82 | 2.27 |
| d16 | 1.29 | 1.74 | 2.29 |
| d21 | 2.86 | 2.62 | 1.18 |
| d23 | 7.39 | 7.63 | 9.07 |
| d25 | 2.76 | 14.94 | 33.51 |
| d27 | 17.48 | 18.34 | 18.85 |

ZOOM LENS UNIT DATA

| Unit | Starting surface | Focal length |
|---|---|---|
| 1 | 1 | 182.38 |
| 2 | 3 | −25.38 |
| 3 | 11 | 38.97 |
| 4 | 14 | −42.28 |
| 5 | 17 | 21.61 |
| 6 | 22 | −43.63 |
| 7 | 24 | 329.77 |
| 8 | 26 | 219.64 |

Numerical Example 4

UNIT: mm
SURFACE DATA

| Surface No. | r | d | nd | vd |
|---|---|---|---|---|
| 1 | 57.509 | 5.16 | 1.60311 | 60.6 |
| 2 | 205.096 | (variable) | | |
| 3 | 86.022 | 1.50 | 1.85150 | 40.8 |
| 4 | 21.448 | 2.69 | | |
| 5* | 38.852 | 0.15 | 1.56039 | 36.6 |
| 6 | 40.313 | 1.30 | 1.77250 | 49.6 |
| 7 | 14.601 | 7.04 | | |
| 8 | −57.247 | 1.20 | 1.49700 | 81.6 |
| 9 | 24.306 | 0.35 | | |
| 10 | 23.136 | 4.33 | 1.91082 | 35.3 |
| 11 | 310.933 | (variable) | | |
| 12 | 75.644 | 3.09 | 1.59282 | 68.6 |
| 13 | −94.391 | 3.05 | | |
| 14(diaphragm) | ∞ | 2.93 | | |
| 15 | 73.587 | 7.10 | 1.55032 | 75.5 |
| 16 | −13.553 | 1.30 | 1.80420 | 46.5 |
| 17 | −26.222 | (variable) | | |

-continued

| | | | | |
|---|---|---|---|---|
| 18 | 62.686 | 1.50 | 1.87070 | 40.7 |
| 19 | 17.806 | 8.90 | 1.59410 | 60.5 |
| 20 | −37.108 | (variable) | | |
| 21 | 349.610 | 1.20 | 1.87070 | 40.7 |
| 22 | 32.301 | (variable) | | |
| 23* | −797.162 | 2.50 | 1.53110 | 55.9 |
| 24* | 910.780 | (variable) | | |
| 25 | 1862.912 | 5.35 | 1.51742 | 52.2 |
| 26 | −36.134 | (variable) | | |
| Image plane | ∞ | | | |

ASPHERIC DATA

5th surface

K = 0.00000e+000 A 4 = −1.78711e−006 A 6 = 1.18552e−008

23rd surface

K = 0.00000e+000 A 4 = −6.82095e−005 A 6 = 2.64141e−007
A 8 = −1.97264e−009 A10 = 5.95498e−012

24th surface

K = 0.00000e+000 A 4 = −5.99353e−005 A 6 = 2.04911e−007
A 8 = −1.20640e−009 A10 = 2.99152e−012

VARIOUS DATA
Zoom ratio 2.70

| | Wide-angle | Middle | Telephoto |
|---|---|---|---|
| Focal length | 19.72 | 32.07 | 53.16 |
| Fno | 4.12 | 5.08 | 6.07 |
| Half angle of view (°) | 48.13 | 35.50 | 22.43 |
| Image height | 18.50 | 21.64 | 21.64 |
| Overall lens length | 126.89 | 137.98 | 162.14 |
| BF | 21.40 | 30.38 | 51.52 |
| d 2 | 0.67 | 9.96 | 25.28 |
| d11 | 24.10 | 10.74 | 0.80 |
| d17 | 8.62 | 5.36 | 1.83 |
| d20 | 4.53 | 6.06 | 6.02 |
| d22 | 5.56 | 7.29 | 10.86 |
| d24 | 1.37 | 7.55 | 5.19 |
| d26 | 21.40 | 30.38 | 51.52 |

ZOOM LENS UNIT DATA

| Unit | Starting surface | Focal length |
|---|---|---|
| 1 | 1 | 130.79 |
| 2 | 3 | −19.20 |
| 3 | 12 | 33.06 |
| 4 | 18 | 69.01 |
| 5 | 21 | −40.95 |
| 6 | 23 | −800.00 |
| 7 | 25 | 68.57 |

Numerical Example 5

UNIT: mm
SURFACE DATA

| Surface No. | r | d | nd | vd |
|---|---|---|---|---|
| 1 | 62.063 | 1.50 | 1.77830 | 23.9 |
| 2 | 56.087 | 5.67 | 1.72916 | 54.7 |
| 3 | 207.626 | (variable) | | |
| 4 | 166.987 | 1.50 | 1.87070 | 40.7 |
| 5 | 19.406 | 6.48 | | |
| 6 | 93.194 | 1.30 | 1.75500 | 52.3 |
| 7 | 24.593 | 7.15 | | |
| 8 | −38.893 | 1.20 | 1.49700 | 81.6 |
| 9 | 72.839 | 0.25 | | |
| 10 | 44.017 | 6.04 | 1.89190 | 37.1 |
| 11 | −67.133 | (variable) | | |
| 12 | −479.567 | 2.43 | 1.59282 | 68.6 |

-continued

| | | | | |
|---|---|---|---|---|
| 13 | −50.771 | 2.66 | | |
| 14(diaphragm) | ∞ | 0.90 | | |
| 15 | 26.572 | 4.02 | 1.55032 | 75.5 |
| 16 | −18.947 | 1.00 | 1.75500 | 52.3 |
| 17 | −104.111 | 5.33 | | |
| 18 | 34.297 | 1.00 | 1.87070 | 40.7 |
| 19 | 13.696 | 4.83 | 1.59410 | 60.5 |
| 20 | −45.111 | (variable) | | |
| 21 | 41.785 | 1.20 | 1.87070 | 40.7 |
| 22 | 17.825 | (variable) | | |
| 23* | −51.718 | 2.50 | 1.53110 | 55.9 |
| 24* | −44.013 | (variable) | | |
| 25 | −48.971 | 4.14 | 1.51742 | 52.2 |
| 26 | −30.063 | (variable) | | |
| Image plane | ∞ | | | |

ASPHERIC DATA

23rd surface

K = 0.00000e+000 A 4 = 7.20389e−006 A 6 = 6.12510e−007
A 8 = −8.74905e−009 A10 = 4.44564e−011

24th surface

K = 0.00000e+000 A 4 = 1.20516e−005 A 6 = 3.59941e−007
A 8 = −4.10774e−009 A10 = 1.22521e−011

VARIOUS DATA
Zoom ratio 3.18

| | Wide-angle | Middle | Telephoto |
|---|---|---|---|
| Focal length | 18.50 | 35.02 | 58.92 |
| Fno | 4.12 | 5.39 | 6.48 |
| Half angle of view (°) | 49.09 | 31.79 | 19.95 |
| Image height | 18.50 | 21.64 | 21.64 |
| Overall lens length | 132.01 | 138.38 | 160.73 |
| BF | 24.47 | 23.18 | 37.26 |
| d 3 | 0.52 | 11.91 | 26.34 |
| d11 | 35.49 | 13.46 | 1.34 |
| d20 | 3.04 | 2.21 | 0.60 |
| d22 | 4.99 | 5.82 | 7.42 |
| d24 | 2.40 | 20.70 | 26.66 |
| d26 | 24.47 | 23.18 | 37.26 |

ZOOM LENS UNIT DATA

| Unit | Starting surface | Focal length |
|---|---|---|
| 1 | 1 | 120.00 |
| 2 | 4 | −26.16 |
| 3 | 12 | 25.31 |
| 4 | 21 | −36.55 |
| 5 | 23 | 500.00 |
| 6 | 25 | 140.02 |

Numerical Example 6

UNIT: mm
SURFACE DATA

| Surface No. | r | d | nd | vd |
|---|---|---|---|---|
| 1 | 55.873 | 1.50 | 1.76182 | 26.5 |
| 2 | 51.326 | 5.35 | 1.71999 | 50.2 |
| 3 | 161.429 | (variable) | | |
| 4 | 129.661 | 1.50 | 1.87070 | 40.7 |
| 5 | 18.545 | 6.19 | | |
| 6 | 91.584 | 1.30 | 1.75500 | 52.3 |
| 7 | 24.609 | 6.73 | | |
| 8 | −36.819 | 1.20 | 1.49700 | 81.5 |
| 9 | 82.954 | 0.25 | | |
| 10 | 43.868 | 5.83 | 1.89190 | 37.1 |
| 11 | −66.028 | (variable) | | |
| 12 | −562.956 | 3.00 | 1.59282 | 68.6 |

-continued

| | | | | |
|---|---|---|---|---|
| 13 | −53.369 | 4.84 | | |
| 14(diaphragm) | ∞ | 0.80 | | |
| 15 | 32.842 | 3.45 | 1.55032 | 75.5 |
| 16 | −18.593 | 1.00 | 1.75500 | 52.3 |
| 17 | −114.029 | 4.20 | | |
| 18 | 36.476 | 1.00 | 1.87070 | 40.7 |
| 19 | 15.972 | 5.33 | 1.59410 | 60.5 |
| 20 | −43.901 | (variable) | | |
| 21 | 45.177 | 1.20 | 1.87070 | 40.7 |
| 22 | 19.683 | (variable) | | |
| 23* | −50.553 | 2.50 | 1.53110 | 55.9 |
| 24* | −38.515 | (variable) | | |
| 25 | −52.948 | 4.01 | 1.51742 | 52.2 |
| 26 | −32.289 | (variable) | | |
| Image plane | ∞ | | | |

ASPHERIC DATA

23rd surface

K = 0.00000e+000 A 4 = 2.34212e−005 A 6 = 2.65808e−007
A 8 = −1.22942e−010 A10 = −1.27940e−011

24th surface

K = 0.00000e+000 A 4 = 2.47727e−005 A 6 = 1.23081e−007
A 8 = 1.24190e−009 A10 = −1.64146e−011

VARIOUS DATA
Zoom ratio 2.86

| | Wide-angle | Middle | Telephoto |
|---|---|---|---|
| Focal length | 20.60 | 35.03 | 58.91 |
| Fno | 4.12 | 5.20 | 6.31 |
| Half angle of view (°) | 45.90 | 32.29 | 20.22 |
| Image height | 18.80 | 21.64 | 21.64 |
| Overall lens length | 137.68 | 144.32 | 168.87 |
| BF | 27.10 | 27.92 | 45.41 |
| d 3 | 0.69 | 10.05 | 23.93 |
| d11 | 33.23 | 14.33 | 1.58 |
| d20 | 3.91 | 2.99 | 0.58 |
| d22 | 4.71 | 5.64 | 8.05 |
| d24 | 6.84 | 22.21 | 28.13 |
| d26 | 27.10 | 27.92 | 45.41 |

ZOOM LENS UNIT DATA

| Unit | Starting surface | Focal length |
|---|---|---|
| 1 | 1 | 116.29 |
| 2 | 4 | −26.23 |
| 3 | 12 | 27.33 |
| 4 | 21 | −40.96 |
| 5 | 23 | 284.07 |
| 6 | 25 | 150.00 |

Table 1 below illustrates various values in each numerical example.

TABLE 1

| | Example | | | | | |
|---|---|---|---|---|---|---|
| | 1 | 2 | 3 | 4 | 5 | 6 |
| fw | 18.500 | 18.500 | 18.585 | 19.716 | 18.500 | 20.600 |
| ft | 53.013 | 54.017 | 53.709 | 53.163 | 58.922 | 58.914 |
| f1 | 135.000 | 132.500 | 182.380 | 130.790 | 120.000 | 116.290 |
| f2 | −25.859 | −25.234 | −25.384 | −19.197 | −26.155 | −26.230 |
| f3 | 23.31 | 100.00 | 38.97 | 71.32 | 25.31 | 27.33 |
| fX | −23.103 | −26.683 | −32.171 | −33.916 | −25.339 | −25.010 |
| fY | −51.806 | −42.103 | −34.479 | −30.871 | −44.614 | −44.946 |
| fZ | −44.131 | −49.029 | −48.375 | −34.163 | −50.834 | −51.139 |
| RX1 | 140.410 | 92.646 | 93.036 | 86.022 | 166.987 | 129.661 |
| RX2 | 17.508 | 18.435 | 21.560 | 21.448 | 19.406 | 18.545 |
| RY1 | 43.349 | 53.487 | 67.274 | 38.852 | 93.194 | 91.584 |
| RY2 | 20.537 | 20.012 | 18.920 | 14.601 | 24.593 | 24.609 |
| RZ1 | −37.386 | −38.576 | −46.884 | −57.247 | −38.893 | −36.819 |

TABLE 1-continued

| | Example | | | | | |
|---|---|---|---|---|---|---|
| | 1 | 2 | 3 | 4 | 5 | 6 |
| RZ2 | 53.630 | 66.841 | 49.769 | 24.306 | 72.839 | 82.954 |
| R1o | 65.219 | 57.137 | 99.488 | 57.509 | 62.063 | 55.873 |
| R1i | 282.412 | 181.038 | 787.505 | 205.096 | 207.626 | 161.429 |
| skw | 19.523 | 23.407 | 17.479 | 21.404 | 24.470 | 27.103 |
| (1)SFY | 2.801 | 2.196 | 1.783 | 2.204 | 1.717 | 1.735 |
| (2)F1/F2 | −5.221 | −5.251 | −7.185 | −6.813 | −4.588 | −4.433 |
| (3)fZ/f2 | 1.707 | 1.943 | 1.906 | 1.780 | 1.944 | 1.950 |
| (4)SFX | 1.285 | 1.497 | 1.603 | 1.664 | 1.263 | 1.334 |
| (5)SF1 | 1.601 | 1.922 | 1.289 | 1.779 | 1.853 | 2.059 |
| (6)nX/nZ | 1.250 | 1.250 | 1.257 | 1.237 | 1.250 | 1.250 |
| (7)fX/fY | 0.45 | 0.63 | 0.93 | 1.10 | 0.57 | 0.56 |
| (8)fX/f2 | 0.893 | 1.057 | 1.267 | 1.767 | 0.969 | 0.954 |
| (9)skw/fw | 1.055 | 1.265 | 0.941 | 1.086 | 1.323 | 1.316 |
| (10)f1/fw | 7.297 | 7.162 | 9.813 | 6.634 | 6.487 | 5.645 |
| (11)f3/ft | 0.440 | 1.851 | 0.726 | 1.341 | 0.430 | 0.464 |
| (12)V | 0.410 | 0.370 | 0.398 | 0.509 | 0.378 | 0.371 |

[Image-Capturing Apparatus]

Figure 13:
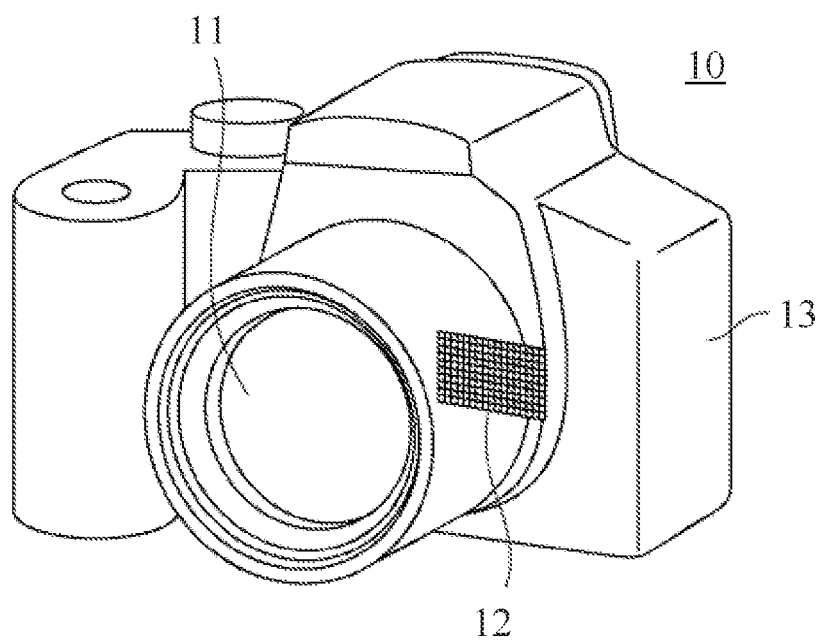
FIG. 13 is a diagram illustrating an image-capturing apparatus including the zoom lens according to any one of Examples 1 to 6.

Referring now to FIG. 13, a description will be given of an example of a digital still camera (image-capturing apparatus) 10 using the zoom lens according to each example as an image-capturing optical system. In FIG. 13, reference numeral 13 denotes a camera body, and reference numeral 11 denotes an image-capturing optical system that includes any one of the zoom lenses described in Examples 1 to 6. Reference numeral 12 denotes a solid-state image sensor (a photoelectric conversion element) such as a CCD sensor and a CMOS sensor, which is built in the camera body 13 and receives an optical image formed by the image-capturing optical system 11 and performs a photoelectric conversion. The camera body 13 may be a so-called single-lens reflex camera having a quick turn mirror, or a so-called mirrorless camera having no quick turn mirror.

By applying the zoom lens according to each example to the image-capturing apparatus such as the digital still camera in this way, it is possible to obtain the image-capturing apparatus having a small lens.

According to the above examples, it is possible to provide a compact zoom lens capable of obtaining the high optical performance while achieving the wider angle.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-113967, filed on Jul. 9, 2021, which is hereby incorporated by reference herein in its entirety.

What is claimed is:

1. A zoom lens consisting of four or more lens units including, in order from an object side to an image side, a first lens unit having a positive refractive power, a second lens unit having a negative refractive power, and a third lens unit having a positive refractive power,
wherein during zooming from a wide-angle end to a telephoto end, the first lens unit moves, a distance between the first lens unit and the second lens unit is widened, and a distance between the second lens unit and the third lens unit is narrowed,
wherein the first lens unit consists of a single positive lens, wherein the second lens unit includes three single lens elements, each having a negative refractive power, arranged continuously in order from the object side to the image side, and wherein following inequalities are satisfied:

$1.715 < SFY < 10.0$, and $-7.5 < f1/f2 < -0.5$, where SFY is a shape factor of a second single lens element adjacent to a first single lens element arranged on a most object side among the three single lens elements, f1 is a focal length of the first lens unit, and f2 is a focal length of the second lens unit.

2. The zoom lens according to claim 1, wherein a following inequality is satisfied:

$1.0 < SFX < 3.0$, where SFX is a shape factor of the first single lens element.

3. The zoom lens according to claim 1, wherein a following inequality is satisfied:

$0.6 < SF1 < 3.0$, where SF1 is a shape factor of the single positive lens of the first lens unit.

4. The zoom lens according to claim 1, wherein a following inequality is satisfied:

$1.19 < nX/nZ < 1.31$, where nX is a refractive index for a d-line of the first single lens element arranged on the most object side among the three single lens elements and nZ is a refractive index for the d-line of a third single lens element arranged on a most image side among the three single lens elements.

5. The zoom lens according to claim 1, wherein a following inequality is satisfied:

$0.35 < fX/fY < 1.50$, where fX is a focal length of the first single lens element, and fY is a focal length of the second single lens element.

6. The zoom lens according to claim 1, wherein a following inequality is satisfied:

$0.70 < fX/f2 < 2.20$, where fX is a focal length of the first single lens element.

7. The zoom lens according to claim 1, wherein a following inequality is satisfied:

$0.90 < skw/fw < 1.45$, where fw is a focal length of the zoom lens at the wide-angle end, and skw is a back focus of the zoom lens at the wide-angle end.

8. The zoom lens according to claim 1, wherein a following inequality is satisfied:

$5.1 < f1/fw < 14.0$, where fw is a focal length of the zoom lens at the wide-angle end.

9. The zoom lens according to claim 1, wherein a following inequality is satisfied:

$0.38 < f3/ft < 2.00$, where f3 is a focal length of the third lens unit, and ft is a focal length of the zoom lens at the telephoto end.

10. The zoom lens according to claim 1, wherein a following inequality is satisfied:

$0.3 < V < 1.0$, where V is a third-order aberration coefficient of distortion at the wide-angle end.

11. The zoom lens according to claim 1, wherein the zoom lens consists of, in order from the object side to the image side, the first lens unit, the second lens unit, the third lens unit, and a rear group composed of one or more lens units, wherein the rear group includes, in order from the object side to the image side, a fourth lens unit having a negative refractive power, a fifth lens unit having a positive refractive power, and a sixth lens unit.

12. The zoom lens according to claim 1, wherein the zoom lens consists of, in order from the object side to the image side, the first lens unit, the second lens unit, the third lens unit, and a rear group composed of one or more lens units, wherein the rear group includes, in order from the object side to the image side, a fourth lens unit having a positive refractive power, a fifth lens unit having a negative refractive power, and a sixth lens unit.

13. A zoom lens consisting of four or more lens units including, in order from an object side to an image side, a first lens unit having a positive refractive power, a second lens unit having a negative refractive power, and a third lens unit having a positive refractive power, wherein during zooming from a wide-angle end to a telephoto end, the first lens unit moves, a distance between the first lens unit and the second lens unit is widened, and a distance between the second lens unit and the third lens unit is narrowed, wherein the first lens unit consists of one element lens having a positive refractive power, wherein the second lens unit includes three single lens elements, each having a negative refractive power, arranged continuously in order from the object side to the image side, and wherein following inequalities are satisfied:

$1.715 < SFY < 10.0$, $-7.5 < f1/f2 < -0.5$, and $0.5 < fZ/f2 < 1.96$, where SFY is a shape factor of a second single lens element adjacent to a first single lens element arranged on a most object side among the three single lens elements, f1 is a focal length of the first lens unit, f2 is a focal length of the second lens unit, fZ is a focal length of a third single lens element arranged on a most image side among the three single lens elements.

14. The zoom lens according to claim 13, wherein a following inequality is satisfied:

$1.0 < SFX < 3.0$, where SFX is a shape factor of the first single lens element.

15. The zoom lens according to claim 13, wherein a following inequality is satisfied:

$0.6 < SF1 < 3.0$, where SF1 is a shape factor of the one element lens having the positive refractive power of the first lens unit.

16. The zoom lens according to claim 13, wherein a following inequality is satisfied:

$1.19 < nX/nZ < 1.31$, where nX is a refractive index for a d-line of the first single lens element arranged on the most object side among the three single lens elements and nZ is a refractive index for the d-line of the third single lens element arranged on the most image side among the three single lens elements.

17. The zoom lens according to claim 13, wherein a following inequality is satisfied:

$0.35 < fX/fY < 1.50$, where fX is a focal length of the first single lens element, and fY is a focal length of the second single lens element.

18. The zoom lens according to claim 13, wherein a following inequality is satisfied:

$0.70 < fX/f2 < 2.20$, where fX is a focal length of the first single lens element.

19. The zoom lens according to claim 13, wherein a following inequality is satisfied:

$0.90 < skw/fw < 1.45$, where fw is a focal length of the zoom lens at the wide-angle end, and skw is a back focus of the zoom lens at the wide-angle end.

20. An image-capturing apparatus comprising:
a zoom lens; and
an image sensor configured to receive an image formed by the zoom lens,
wherein the zoom lens consists of four or more lens units including, in order from an object side to an image side, a first lens unit having a positive refractive power, a second lens unit having a negative refractive power, and a third lens unit having a positive refractive power,
wherein during zooming from a wide-angle end to a telephoto end, the first lens unit moves, a distance between the first lens unit and the second lens unit is widened, and a distance between the second lens unit and the third lens unit is narrowed,
wherein the first lens unit consists of a single positive lens,
wherein the second lens unit includes three single lens elements, each having a negative refractive power, arranged continuously in order from the object side to the image side, and
wherein following inequalities are satisfied:

$1.715 < SFY < 10.0$, and $-7.5 < f1/f2 < -0.5$, where SFY is a shape factor of a second single lens element adjacent to a first single lens element arranged on a most object side among the three single lens elements, f1 is a focal length of the first lens unit, and f2 is a focal length of the second lens unit.

* * * * *